United States Patent
Navon et al.

(10) Patent No.: US 12,008,254 B2
(45) Date of Patent: Jun. 11, 2024

(54) DEDUPLICATION OF STORAGE DEVICE ENCODED DATA

(71) Applicant: Western Digital Technologies, Inc., San Jose, CA (US)

(72) Inventors: Ariel Navon, Revava (IL); Shay Benisty, Beer Sheva (IL)

(73) Assignee: Western Digital Technologies, Inc., San Jose, CA (US)

( * ) Notice: Subject to any disclaimer, the term of this patent is extended or adjusted under 35 U.S.C. 154(b) by 58 days.

(21) Appl. No.: 17/182,725

(22) Filed: Feb. 23, 2021

(65) Prior Publication Data

US 2022/0221999 A1 Jul. 14, 2022

Related U.S. Application Data

(60) Provisional application No. 63/135,044, filed on Jan. 8, 2021.

(51) Int. Cl.
*G06F 3/06* (2006.01)
*G06F 11/10* (2006.01)

(52) U.S. Cl.
CPC .......... *G06F 3/0641* (2013.01); *G06F 3/0608* (2013.01); *G06F 3/0659* (2013.01); *G06F 3/0673* (2013.01); *G06F 11/1076* (2013.01)

(58) Field of Classification Search
CPC .... G06F 3/0641; G06F 3/0608; G06F 3/0659; G06F 3/0673; G06F 11/1076
See application file for complete search history.

(56) References Cited

U.S. PATENT DOCUMENTS

| | | | |
|---|---|---|---|
| 3,742,460 A * | 6/1973 | Englund | G11C 15/04 |
| 5,572,736 A * | 11/1996 | Curran | G06F 13/4072 |
| | | | 326/26 |
| 8,732,403 B1 | 5/2014 | Nayak | |
| 8,849,767 B1 | 9/2014 | Zheng et al. | |
| 9,678,968 B1 | 6/2017 | Taylor et al. | |
| 9,715,434 B1 | 7/2017 | Xu et al. | |
| 9,773,118 B1 * | 9/2017 | Bennett | G06F 21/6218 |
| 10,108,543 B1 | 10/2018 | Duggal et al. | |
| 10,108,544 B1 | 10/2018 | Duggal et al. | |
| 10,747,447 B1 | 8/2020 | Patwardhan et al. | |
| 10,795,812 B1 | 10/2020 | Duggal et al. | |
| 10,817,475 B1 * | 10/2020 | Faibish | G06F 16/1744 |

(Continued)

OTHER PUBLICATIONS

A presentation by the SNIA Europe titled "Everything You Wanted to Know about Storage (But were too proud to ask) The Basics" by Bob Plumridge and Alex McDonald, copyright 2017 Storage Networking Industry Association). (Year: 2017).*

(Continued)

*Primary Examiner* — Michael Krofcheck
*Assistant Examiner* — Janice M. Girouard
(74) *Attorney, Agent, or Firm* — Patent Law Works LLP

(57) ABSTRACT

Systems and methods for deduplication of storage device encoded data are described. The storage device may initiate a deduplication process and determine a encoded target data block and at least one encoded comparison data block. The storage device may compare the encoded target data block to the encoded comparison data blocks to determine similarity values. Based on the similarity values, the storage device may determine duplicate data units and eliminate extra duplicate data units.

20 Claims, 7 Drawing Sheets

(56) References Cited

U.S. PATENT DOCUMENTS

| | | | |
|---|---|---|---|
| 2007/0050584 A1* | 3/2007 | Asauchi | G11C 16/22 |
| | | | 711/163 |
| 2007/0146033 A1* | 6/2007 | Pesci | H03K 5/1534 |
| | | | 327/218 |
| 2008/0144079 A1 | 6/2008 | Pandey et al. | |
| 2010/0077013 A1 | 3/2010 | Clements et al. | |
| 2010/0088296 A1 | 4/2010 | Periyagaram et al. | |
| 2010/0174881 A1 | 7/2010 | Anglin et al. | |
| 2010/0281081 A1 | 11/2010 | Stager et al. | |
| 2010/0333116 A1 | 12/2010 | Prahlad et al. | |
| 2011/0246741 A1* | 10/2011 | Raymond | G06F 16/137 |
| | | | 711/170 |
| 2013/0151756 A1 | 6/2013 | Tofano | |
| 2013/0205176 A1* | 8/2013 | Qian | H04L 1/0038 |
| | | | 714/704 |
| 2013/0318288 A1* | 11/2013 | Khan | G06F 3/0679 |
| | | | 711/103 |
| 2014/0006536 A1* | 1/2014 | Guilford | H03M 7/3068 |
| | | | 709/212 |
| 2015/0205816 A1 | 7/2015 | Periyagaram et al. | |
| 2015/0261776 A1 | 9/2015 | Attarde et al. | |
| 2016/0350324 A1 | 12/2016 | Wang et al. | |
| 2017/0149451 A1* | 5/2017 | Shany | H03M 13/1575 |
| 2018/0121108 A1 | 5/2018 | Dain et al. | |
| 2018/0267733 A1* | 9/2018 | Xie | G06F 11/1048 |
| 2018/0314727 A1 | 11/2018 | Epstein et al. | |
| 2018/0329631 A1* | 11/2018 | Swift | G06F 3/0608 |
| 2019/0129972 A1 | 5/2019 | Borate et al. | |
| 2019/0179556 A1 | 6/2019 | Kanai | |
| 2020/0219579 A1* | 7/2020 | Bhasin | G11C 29/14 |
| 2020/0301593 A1 | 9/2020 | Vaithianathan et al. | |
| 2020/0310686 A1 | 10/2020 | Truong et al. | |
| 2020/0341668 A1* | 10/2020 | Gonczi | G06F 3/0688 |
| 2020/0349132 A1* | 11/2020 | Gonczi | H03M 7/3091 |
| 2020/0409908 A1 | 12/2020 | Ahn et al. | |
| 2021/0149846 A1* | 5/2021 | McGregor | G06F 3/0641 |
| 2021/0374021 A1 | 12/2021 | Santhakumar et al. | |

OTHER PUBLICATIONS

1 Hong, B., et al., Duplicate Data Elimination in a SAN File System, 2004, p. 301-314.

Geer, "Reducing the Storage Burden via Data Deduplication," Industry Trends, Dec. 2008, pp. 15-17, https://ieeexplore.ieee.org/stamp/stamp.jsp?tp=&amumber=4712493.

Leekasul et al., "Dynamic Data Deduplication in Cloud Storage," Apr. 2014, IEEE 8th International Symposium on Service Oriented System Engineering, pp. 1-7, https://eprints.whiterose.ac.uk/948969/1/wara.pdf.

Yan, "SES-Dedup: A Case for Low-Cost ECC-based SSD Deduplication," 2019, 35th Symposium on Mass Storage Systems and Technologies, pp. 292-298, https://ieeexplore.ieee.org/stamp/stamp.jsp?tp=&arnumber=8890081.

\* cited by examiner

DEDUPLICATION OF STORAGE DEVICE ENCODED DATA

TECHNICAL FIELD

The present disclosure generally relates to data deduplication in storage devices and, more particularly, to deduplication of error correction code encoded data.

BACKGROUND

Storage devices, such as disk drives (solid-state drives, hard disk drives, hybrid drives, tape drives, etc.), universal serial bus (USB) flash drives, secure digital (SD) cards and SD extended capacity (SDXC) cards, and other form factors, may be used for storing data on behalf of a host, host system, or host device. These storage devices may include integrated storage devices built into the enclosure of the host device, removable storage devices mating with the host device through a physical interface connector (directly or through an interface cable), and network storage devices communicating with the host device using network protocols over a wired or wireless network connection. Some removable storage devices and/or network storage devices may use short range wireless communication, such as Bluetooth, ultra-wideband (UWB), Wi-Fi, Zigbee, etc., for communication with a host device or network. Storage devices may be integrated into storage systems that vary from single storage devices directly supporting a host device through a peripheral storage interface to multi-device storage systems (often supporting multiple host systems) that include multiple storage devices arranged in an array of drives interconnected by a common communication fabric and, in many cases, controlled by a storage controller, redundant array of independent disks (RAID) controller, or general controller, for coordinating storage and system activities across the array of drives.

Host data stored to one or more storage devices may result in duplicate copies. In some systems, duplicate copies may be desirable, up to a point. For example, duplicate copies may be stored for data protection and redundancy policies to prevent data loss in the event that a copy is lost or corrupted and/or duplicate copies may be stored to support multiple users and/or instances of applications using the data. Storage systems may be configured to intentionally store and maintain multiple copies of image data, audio files, video files, databases, and other data units, files, or objects, but may still result in the creation and storage of unwanted duplicates that unnecessarily use storage resources. Storage systems may include a deduplication function for identifying duplicate data and reducing the number of copies to a desirable level, whether one or more.

In some storage systems, deduplication may be managed at the host or storage controller level, requiring that host data be decoded and transferred from the storage devices storing the data to determine whether undesired duplicates exist and should be deleted. For example, a host device or storage controller may run a background scan and/or respond to incoming storage requests by searching one or more storage devices for duplicate data. The storage device may decode and transfer potentially duplicate data to the host for further processing. If duplicates exist, the host or controller may issue delete commands for the unnecessary duplicates and/or reject the incoming copy to reduce duplication and/or prevent additional duplication.

A more efficient deduplication process for storage devices that reduces the data decoded and transferred from the storage device may be advantageous. Efficient systems and methods of using storage device resources to reduce data transfer to the host device for data deduplication may be needed.

SUMMARY

Various aspects for deduplication of storage device encoded data, particularly storage device comparison of encoded host data to determine a similarity value for duplicate identification, are described.

One general aspect includes a storage system including a storage device that includes a storage medium configured to store host data and a storage device controller, including a processor and a memory. The storage device controller is configured to: encode, using an error correction code a target data unit and at least one comparison data unit in the storage medium; determine the encoded target data unit for a deduplication operation; determine a first encoded comparison data unit for the deduplication operation; compare the encoded target data unit to the first encoded comparison data unit; determine, based on the comparison of the encoded target data unit and the first encoded comparison data unit, a first similarity value; and eliminate, responsive to the first similarity value, at least one duplicate data unit selected from the target data unit and the at least one comparison data unit in the storage medium.

Implementations may include one or more of the following features. The storage device controller may be further configured to: receive, from a host device, a write command indicating the target data unit for the deduplication operation; initiate, responsive to receiving the write command, the deduplication operation; select the first encoded comparison data unit from the storage medium; and eliminate, responsive to the first similarity value, the target data unit by discarding the write command. The storage device controller may be further configured to: receive, from a host device, a deduplication command; initiate, responsive to the deduplication command, the deduplication operation; select the first encoded comparison data unit from the storage medium; eliminate, responsive to the first similarity value, the first encoded comparison data unit by processing a delete operation for the comparison data unit; and notify the host device of the delete operation. The storage device controller may be further configured to: initiate, responsive to deduplication trigger rules, the deduplication operation; scan, responsive to the deduplication operation, the host data to determine the first encoded comparison data unit from a plurality of host data units stored in the storage medium; determine, based on the scan, a plurality of encoded comparison data units including the first encoded comparison data unit; compare the encoded target data unit to each encoded comparison data unit of the plurality of encoded comparison data units; determine, based on each comparison of the encoded target data unit and each encoded comparison data unit, a comparison data unit similarity value; determine, based on the comparison data unit similarity values, a plurality of duplicate data units; and eliminate at least one duplicate data unit of the plurality of duplicate data units. The storage device controller may be further configured to: determine a target number of duplicate data units for the target data unit; determine a duplicate number of the plurality of duplicate data units; determine a difference between the target number and the duplicate number; and eliminate, based on the difference, an elimination number of the plurality of duplicate data units from the storage medium. The storage device controller may be further configured to: determine a set of metadata criteria for the target data unit; scan, responsive to the deduplication operation and using the set of metadata criteria, host metadata to determine a plurality of encoded comparison data units including the first encoded comparison data unit; compare the encoded target data unit to each encoded comparison data unit of the plurality of encoded comparison data units; determine, based on each comparison of the encoded target data unit and each encoded comparison data unit, a comparison data unit similarity value; determine, based on the comparison data unit similarity values, a plurality of duplicate data units; and eliminate at least one duplicate data unit of the plurality of duplicate data units. Comparing the encoded target data unit to the first encoded comparison data unit may include a bit-by-bit exclusive-or comparison and the first similarity value may be based on a number of bits that are not equal between the encoded target data unit and the first encoded comparison data unit. The storage device may further include a first set of latch registers and a second set of latch registers and the storage device controller may be further configured to: read the encoded target data unit into the first set of latch registers; read the first encoded comparison data unit into the second set of latch registers; execute a bit-by-bit exclusive-or comparison of aligned latch registers between the first set of latch registers and the second set of latch registers; and sum the number of bits that are not equal to determine the first similarity value. The storage device controller may be further configured to: determine a similarity threshold corresponding to a number of acceptable bit errors; compare the first similarity value to the similarity threshold; and eliminate, responsive to the first similarity value being less than the similarity threshold, at least one duplicate data unit selected from the target data unit and the at least one comparison data unit in the storage medium. The storage device controller may be further configured to: select, based on the first similarity value, the first encoded comparison data unit for duplicate verification; determine, based on a decoded first comparison data unit, a first hash value of the decoded first comparison data unit; determine, based on a decoded target data unit, a target hash value of the decoded target data unit; and determine, based on comparing the first hash value and the target hash value, the at least one duplicate data unit. The system may include a host device that includes a host processor, a host memory, and a deduplication manager configured to: determine a decoded target data unit; receive, from the storage device and responsive to the first similarity value, a decoded first comparison data unit; determine, based on the decoded first comparison data unit, a first hash value of the decoded first comparison data unit; determine, based on the decoded target data unit, a target hash value of the decoded target data unit; determine, based on comparing the first hash value and the target hash value, the at least one duplicate data unit; and send, to the storage device, a delete command for the at least one duplicate data unit.

Another general aspect includes a computer-implemented method that includes: encoding, by a storage device and using an error correction code, a target data unit and at least one comparison data unit in a storage medium of the storage device; determining the encoded target data unit for a deduplication operation; determining a first encoded comparison data unit for the deduplication operation; comparing the encoded target data unit to the first encoded comparison data unit; determining, based on the comparison of the encoded target data unit and the first encoded comparison data unit, a first similarity value; and eliminating, responsive to the first similarity value, at least one duplicate data unit selected from the target data unit and the at least one comparison data unit in the storage medium.

Implementations may include one or more of the following features. The computer-implemented method may include: scanning, responsive to the deduplication operation, host data to determine the first encoded comparison data unit from a plurality of host data units stored in the storage medium; determining, based on the scanning, a plurality of encoded comparison data units including the first encoded comparison data unit; comparing the encoded target data unit to each encoded comparison data unit of the plurality of encoded comparison data units; determining, based on each comparison of the encoded target data unit and each encoded comparison data unit, a comparison data unit similarity value; determining, based on the comparison data unit similarity values, a plurality of duplicate data units; and eliminating at least one duplicate data unit of the plurality of duplicate data units. The computer-implemented method may include: determining a target number of duplicate data units for the target data unit; determining a duplicate number of the plurality of duplicate data units; determining a difference between the target number and the duplicate number; and eliminating, based on the difference, an elimination number of the plurality of duplicate data units from the storage medium. The computer-implemented method may include: determining a set of metadata criteria for the target data unit; scanning, responsive to the deduplication operation and using the set of metadata criteria, host metadata to determine a plurality of encoded comparison data units including the first encoded comparison data unit; comparing the encoded target data unit to each encoded comparison data unit of the plurality of encoded comparison data units; determining, based on each comparison of the encoded target data unit and each encoded comparison data unit, a comparison data unit similarity value; determining, based on the comparison data unit similarity values, a plurality of duplicate data units; and eliminating at least one duplicate data unit of the plurality of duplicate data units. Comparing the encoded target data unit to the first encoded comparison data unit may include a bit-by-bit exclusive-or comparison and the first similarity value may be based on a number of bits that are not equal between the encoded target data unit and the first encoded comparison data unit. The computer-implemented method may include: reading the encoded target data unit into a first set of latch registers in the storage device; reading the first encoded comparison data unit into a second set of latch registers in the storage device; executing a bit-by-bit exclusive-or comparison of aligned latch registers between the first set of latch registers and the second set of latch registers; and summing the number of bits that are not equal to determine the first similarity value. The computer-implemented method may include: determining a similarity threshold corresponding to a number of acceptable bit errors; comparing the first similarity value to the similarity threshold; and eliminating, responsive to the first similarity value being less than the similarity threshold, at least one duplicate data unit selected from the target data unit and the at least one comparison data unit in the storage medium. The computer-implemented method may include: selecting, based on the first similarity value, the first encoded comparison data unit for duplicate verification; determining, based on a decoded first comparison data unit, a first hash value of the decoded first comparison data unit; determining, based on a decoded target data unit, a target hash value of the decoded target data unit; and determining, based on comparing the first hash value and the target hash value, the at least one duplicate data unit.

Still another general aspect includes a storage device that includes: a storage medium configured to store host data; a storage device controller that includes a processor and an operating memory; means for encoding, using an error correction code a target data unit and at least one comparison data unit in the storage medium; means for determining the encoded target data unit for a deduplication operation; means for determining a first encoded comparison data unit for the deduplication operation; means for comparing the encoded target data unit to the first encoded comparison data unit; means for determining, based on the comparison of the encoded target data unit and the first encoded comparison data unit, a first similarity value; and means for eliminating, responsive to the first similarity value, at least one duplicate data unit selected from: the target data unit; and the at least one comparison data unit in the storage medium.

The various embodiments advantageously apply the teachings of storage devices and/or storage systems to improve the functionality of such computer systems. The various embodiments include operations to overcome or at least reduce the issues previously encountered in storage systems and, accordingly, are more efficient and/or cost-effective than other computing systems. That is, the various embodiments disclosed herein include hardware and/or software with functionality to improve deduplication of host data stored in a storage device, such as by the storage device comparing encoded host data, without decoding or transferring to a host, to determine a similarity value for duplicate identification. Accordingly, the embodiments disclosed herein provide various improvements to storage networks and/or storage systems.

It should be understood that language used in the present disclosure has been principally selected for readability and instructional purposes, and not to limit the scope of the subject matter disclosed herein.

DETAILED DESCRIPTION

Figure 1:
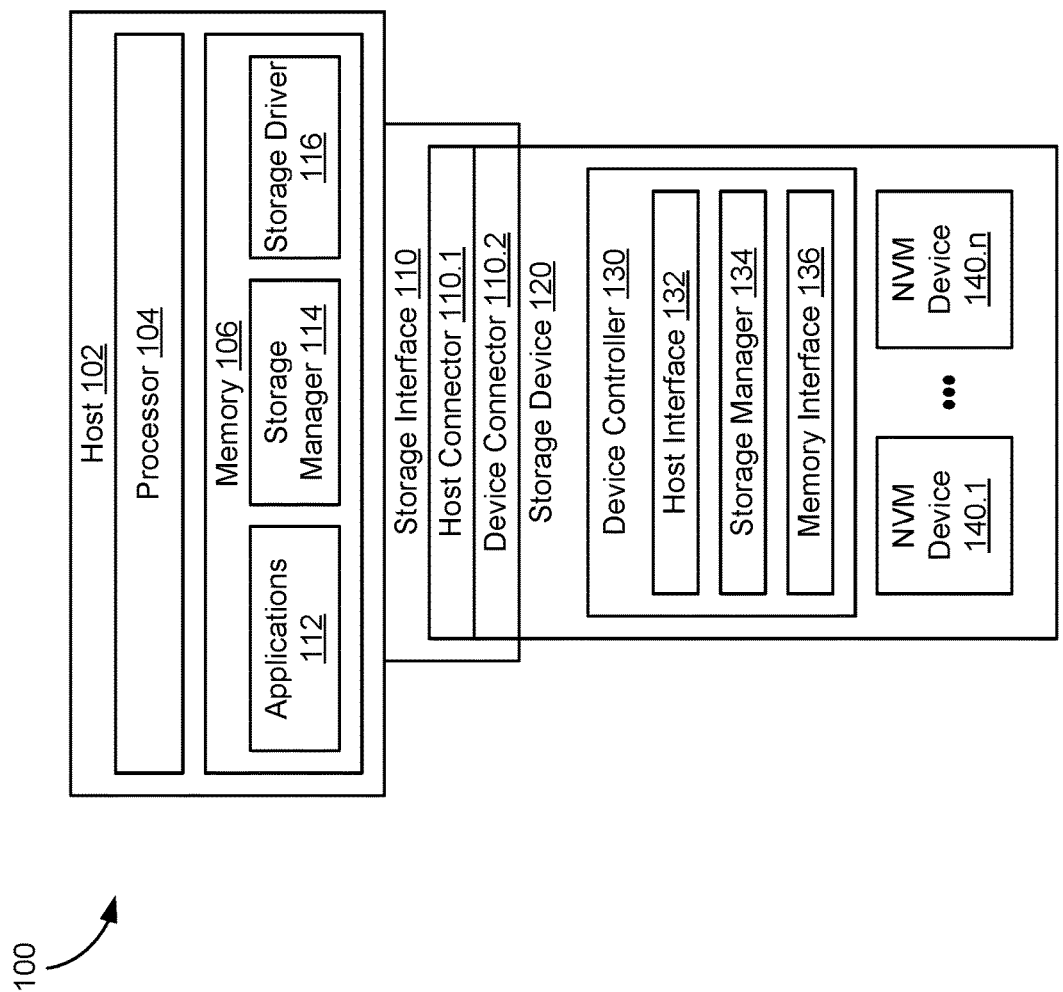
FIG. 1 schematically illustrates a storage system with host device and a storage device.

FIG. 1 shows an embodiment of an example data storage system 100 with a data storage device 120 interconnected by a storage interface 110 to host device 102. While some example features are illustrated, various other features have not been illustrated for the sake of brevity and so as not to obscure pertinent aspects of the example embodiments disclosed herein. To that end, as a non-limiting example, data storage system 100 includes one or more data storage devices 120 (also sometimes called information storage devices, disk drives, or drives) in communication with one or more host devices 102. In some embodiments, host device 102 may be a user device with an embedded computing system, such as video camera, mobile phone, tablet computer, smart television, smart appliance, portable game device, printer, or other consumer electronic device. In some embodiments, storage device 120 may be a removable storage device, such as a universal serial bus (USB) flash drive, secure digital (SD) card, extended capacity (SDXC) SD card, or other removable storage device.

In some embodiments, storage device 120 may be configured in a server, storage array blade, or similar storage unit as a standalone appliance or for use in data center storage racks or chassis. Storage device 120 may be one of a plurality of storage devices, such as hard disk drives (HDDs), solid state drives (SSDs), hybrid drives, etc., installed in a server, storage node, or storage array. Storage device 120 may interface with one or more host devices 102 and provide data storage and retrieval capabilities for or through those host systems. In some embodiments, host device 102 may support one or more client systems or devices configured to access data in or about storage device 120. For example, clients may include one or more applications that access data from storage device 120 through host device 102 and/or through a network or network fabric. In some embodiments, storage device 120 may be configured in a storage hierarchy that includes storage nodes, storage controllers, and/or other intermediate components between storage device 120 and host device 102. For example, each storage controller may be responsible for a corresponding set of storage nodes and their respective storage devices connected through a corresponding backplane network and/or network fabric, though only storage device 120 and host device 102 are shown.

In the embodiment shown, storage device 120 is attached to storage interface 110 for host communication with host device 102. For example, host device 102 may include a host connector 110.1, such as a peripheral component interface express (PCIe) connector, USB slot, memory card slot/reader (for Memory Stick, MultiMedia Card, SD, SDXC, etc. memory cards), etc., that provides a physical connector configured to mate with a corresponding storage device connector 110.2. In some embodiments, host connector 110.1 may define a slot or port providing a wired internal connection to a host bus or storage interface controller. In some embodiments, device connector 110.2 may include a portion of a storage device housing or projection therefrom that removably inserts into the slot or port in host connector 110.1 to provide a physical attachment and electrical connection for host-device communication. In some embodiments, an intervening wire, extender, switch, or similar device compatible with host connector 110.1 and device connector 110.2 may be inserted between host connector 110.1 and device connector 110.2 without materially changing the host-device interface or operation of storage interface 110.

In some embodiments, storage interface 110 may be configured to use network communication protocols. Host connector 110.1 and device connector 110.2 may include any type of physical connector compatible with one or more network and/or internet protocols. For example, host connector 110.1 and device connector 110.2 may include ethernet, PCIe, Fibre Channel, small computer serial interface (SCSI), serial attached SCSI (SAS), or another network-capable interface. In some embodiments, storage device 120 may communicate through a backplane network, network switch(es), and/or other hardware and software components accessed through storage interface 110 for reaching host device 102. For example, storage interface 110 may include or interconnect with a plurality of physical port connections and intermediate components that define physical, transport, and other logical channels for establishing communication with the different components and subcomponents for establishing a communication channel between host device 102 and storage device 120. In some embodiments, storage interface 110 may provide a primary host interface for storage device management and host data transfer, as well as a control interface that includes limited connectivity to the host for low-level control functions, such as through a baseboard management controller (BMC).

In some embodiments, data storage device 120 is, or includes, a solid-state memory device. Data storage device may include a non-volatile memory (NVM) or storage device controller 130 based on compute resources (processor and memory) and a plurality of NVM or media devices 140 for data storage (e.g., one or more NVM device(s), such as one or more flash memory devices). In some embodiments, storage device controller 130 may include a host interface controller 132, a storage manager 134, and one or more memory interface controllers 136. For example, host interface controller 132 may include a physical subsystem, such as an application specific integrated circuit (ASIC) or system on a chip (SOC), and/or logic or firmware running on the general compute resources of storage device controller 130 for configuring and controlling communication with host device 102 over storage interface 110. Storage manager 134 may include configuration, background, and storage processing operations running on the general compute resources of storage device controller 130 to coordinate operation of storage device 120, host interface 132, and memory interface 136. Memory interface 136 may include a physical memory bus and related resources for connecting to media devices 140.1-140.n, such as flash controllers or channel controllers (e.g., for storage devices having NVM devices in multiple memory channels). In some embodiments, data storage devices 120 may each be packaged in a housing, such as a multi-part sealed housing with a defined form factor and ports and/or connectors, such as device connector 110.2, for interconnecting with storage interface 110.

In some embodiments, data storage device 120 may include a single medium device while in other embodiments data storage device 120 includes a plurality of media devices. In some embodiments, media devices 140 may include NAND-type flash memory or NOR-type flash memory. In some embodiments, data storage device 120 may include one or more hard disk drives (HDDs), hybrid drives, tape drives, or other storage device types and corresponding media devices 140. In some embodiments, data storage device 120 may include a flash memory device, which in turn includes one or more flash memory die, one or more flash memory packages, one or more flash memory channels, or the like. However, in some embodiments, data storage device 120 may have other types of non-volatile data storage media (e.g., phase-change random access memory (PCRAM), resistive random access memory (ReRAM), spin-transfer torque random access memory (STT-RAM), magneto-resistive random access memory (MRAM), etc.).

In some embodiments, storage device 120 includes storage device controller 130, which includes one or more processing units (also sometimes called CPUs or processors or microprocessors or microcontrollers) configured to execute instructions in one or more programs. In some embodiments, the one or more processors are shared by one or more components within, and in some cases, beyond the function of the device controller. Media devices 140 may be coupled to device controller 130 through connections that typically convey commands in addition to data, and optionally convey metadata, error correction information and/or other information in addition to data values to be stored in media devices and data values read from media devices 140. Media devices 140 may include any number (i.e., one or more) of memory devices including, without limitation, non-volatile semiconductor memory devices, such as flash memory device(s).

In some embodiments, media devices 140 in storage device 120 are divided into a number of addressable and individually selectable blocks, sometimes called erase blocks. In some embodiments, individually selectable blocks are the minimum size erasable units in a flash memory device. In other words, each block contains the minimum number of memory cells that can be erased simultaneously (i.e., in a single erase operation). Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector or codeword, which is a subunit of a page. That is, a block includes a plurality of pages, each page contains a plurality of sectors or codewords, and each sector or codeword is the minimum unit of data for reading data from the flash memory device.

A data unit may describe any size allocation of data, such as host block, data object, sector, page, multi-plane page, erase/programming block, media device/package, etc. Storage locations may include physical and/or logical locations on storage devices 120 and may be described and/or allocated at different levels of granularity depending on the storage medium, storage device/system configuration, and/or context. For example, storage locations may be allocated at a host logical block address (LBA) data unit size and addressability for host read/write purposes but managed as pages with storage device addressing managed in the media flash translation layer (FTL) in other contexts. Media segments may include physical storage locations in storage device 120, which may also correspond to one or more logical storage locations. In some embodiments, media segments may include a continuous series of physical storage location, such as adjacent data units on a storage medium, and, for flash memory devices, may correspond to one or more media erase or programming blocks. A logical data group may include a plurality of logical data units that may be grouped on a logical basis, regardless of storage location, such as data objects, files, or other logical data constructs composed of multiple host blocks. In some configurations, logical and/or physical zones may be assigned within storage device 120 as groups of data blocks allocated for specified host data management purposes.

In some embodiments, host, host system, or host device 102 may be coupled to data storage system 100 through a network interface that is part of host fabric network that includes storage interface 110 as a host fabric interface. In some embodiments, multiple host devices 102 (only one of which is shown in FIG. 1) and/or clients are coupled to data storage system 100 through the fabric network, which may include a storage network interface or other interface capable of supporting communications with multiple host systems. In some embodiments, the fabric network may operate over a wired and/or wireless network (e.g., public and/or private computer networks in any number and/or configuration) which may be coupled in a suitable way for transferring data. For example, the network may include any means of a conventional data communication network such as a local area network (LAN), a wide area network (WAN), a telephone network, such as the public switched telephone network (PSTN), an intranet, the internet, or any other suitable communication network or combination of communication networks.

Host device 102 may be any suitable computer device, such as a computer, a computer server, a laptop computer, a tablet device, a netbook, an internet kiosk, a personal digital assistant, a mobile phone, a smart phone, a gaming device, a smart appliance, a camera or video camera, consumer electronics device, or any other computing device. Host device 102 is sometimes called a host, client, or client system, depending on respective roles, configurations, and contexts. In some embodiments, host device 102 is distinct from a storage controller, storage node, or storage interface component housing or receiving storage device 120. In some embodiments, host device 102 may be any computing device configured to store and access data in storage device 120.

Host device 102 may include one or more central processing units (CPUs) or processors 104 for executing compute operations or instructions for accessing storage devices 120 through storage interface 110. In some embodiments, processor 104 may be associated with operating memory 106 for executing both storage operations and a storage interface protocol compatible with storage interface 110 and storage device 120. In some embodiments, a separate storage interface unit (not shown) may provide the storage interface protocol and related processor and memory resources. From the perspective of storage device 120, storage interface 110 may be referred to as a host interface and provides a host data path between storage device 120 and host device 102.

Host device 102 may include memory 106 configured to support various data access and management functions, generally in support of one or more applications 112. Memory 106 may include a random access memory (RAM) or another type of dynamic storage device that stores information and instructions for execution by processor 104 and/or a read only memory (ROM) or another type of static storage device that stores static information and instructions for use by processor 104 and/or any suitable storage element such as a hard disk or a solid state storage element. For example, memory 106 may include one or more dynamic random access memory (DRAM) devices for use by host device 102 for command, management parameter, and/or host data storage and transfer to and from storage device 120. In some embodiments, storage devices 120 may be configured for direct memory access (DMA), such as using remote direct memory access (RDMA) protocols, over storage interface 110 to interact with host device 102.

In some embodiments, host device 102 may include one or more applications 112 instantiated in host memory 106 for execution by host processor 104. Applications 112 may include and/or be configured to access one or more storage management functions of storage manager 114. Storage manager 114 may include applications, services, libraries, and/or corresponding interfaces for managing the contents and operation of storage device 120 on behalf of host device 102. For example, storage manager 114 may include services for monitoring storage device parameters, such as total capacity, capacity used, and capacity available, tracking storage device I/O history, performance, and workload, and initiating host storage maintenance functions, such as deduplication, media scans, defragmentation, host data transfer or reorganization, etc. In some embodiments, storage manager 114 may configure and manage storage device 120 for in-device deduplication operations and/or shared deduplication operations, where storage device 120 identifies duplicates using a first similarity criteria and selectively forward those duplicates to host device 102 to determine actionable duplicates using a second similarity criteria. For example, storage manager 114 may include a deduplication function for initiating deduplication operations in storage device 120 based on deduplication or storage commands, as well as logic for managing and/or eliminating identified duplicates. Storage manager 114 may include and/or be configured to access a storage driver 116 configured to manage communications with storage device 120 in accordance with a defined storage protocol supported by storage interface 110 and host and storage device configuration parameters. In some embodiments, storage driver 116 may be an operating system and/or firmware service or set of services configured to initialize, control, and manage communication through storage interface 110 to storage device 120.

In some embodiments, data storage system 100 includes one or more processors, one or more types of memory, a display and/or other user interface components such as a keyboard, a touch screen display, a mouse, a track-pad, and/or any number of supplemental devices to add functionality. In some embodiments, data storage system 100 does not have a display and other user interface components.

Figure 2:
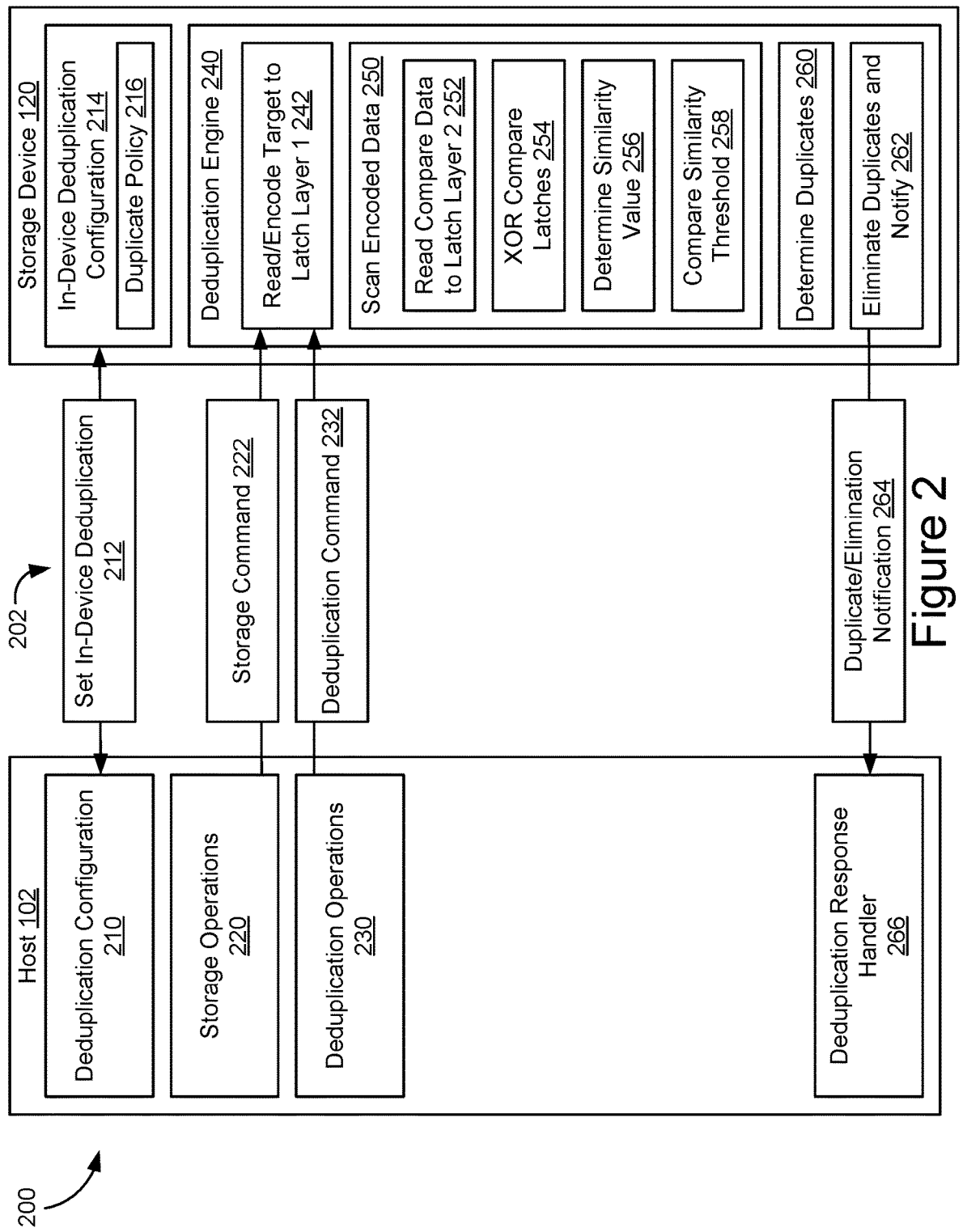
FIG. 2 schematically illustrates an in-device deduplication process that may be used by the storage system of FIG. 1.

FIG. 2 shows a schematic representation of a host/storage interface for in-device deduplication based on encoded host data that may be used by a storage system 200 configured similarly to storage system 100 of FIG. 1. Host device 102 may be configured for communication with storage device 120, such as through a storage interface similar to storage interface 110 in FIG. 1. In some embodiments, communications 202 may include messages passed between host device 102 and storage device 120. For example, host device 102 and storage device 120 may support bi-directional packetized communication using a master-slave or multi-master configuration over a communication bus or network connection between them. In some embodiments, communications 202 between host device 102 and storage device 120 may include register-based communication controlled solely by host device 102. For example, the interface between storage device 120 and host device 102 may define a set of memory locations in storage device 120 that are accessible to host device 102, such as function registers and/or data buffers of an SD card interface or a command and/or data buffer configured for RDMA access. Host device 102 may read storage device memory locations to receive feature support information, data transfers, and/or duplicate and/or removal notifications. Host device 102 may write to storage device memory locations to set configuration parameters and/or initiate deduplication operations through storage commands or deduplication commands.

In some embodiments, host device 102 and storage device 120 may include deduplication configuration parameters, such as deduplication configuration 210 and in-device deduplication configuration 214. For example, deduplication configuration 210 may include configuration parameters for enabling in-device deduplication and determining whether deduplication is enabled for storage operations, such as write operations and/or read operations, and/or specific deduplication commands. Host device 102 and/or storage device 120 may define a default deduplication configuration.

For example, host device 102 may be configured to manage all deduplication at the host level, requesting decoded host data from storage device 120 for deduplication operations, as a default configuration. Host device 102, by interrogating deduplication support parameters in storage device 120, may determine that storage device 120 supports in-device deduplication based on encoded host data to provide at least a first layer of duplicate detection. Responsive to host device 102 determining that in-device deduplication is supported by storage device 120, host device 102 may set in-device deduplication 212 using a corresponding configuration parameter in deduplication configuration 210 and/or in-device deduplication configuration 214. In some embodiments, storage device 120 may include a set of deduplication configuration parameters in in-device deduplication configuration 214. For example, deduplication parameter may determine whether deduplication operations are initiated as a background or idle operation by storage device 120 (based on background/idle operation resources and priorities), executed as part of all read and write operations or only host storage operations including a deduplication parameter, or responsive to a defined deduplication command from host device 102. In some embodiments, deduplication configuration 210 and/or in-device deduplication configuration 214 may include deduplication rules and/or duplicate policy 216 to determine the number of duplicates that may be acceptable. For example, a simple duplicate policy 216 may define a number of acceptable copies, such as 1 if only unique data units are retained or another integer value if more copies are acceptable. In some embodiments, a dynamic duplicate policy 216 may use a deduplication rule set to determine the number of acceptable duplicates for each host data unit based on use or other parameters.

In some embodiments, host device 102 may use storage operations 220, such as host data read and/or write operations, to initiate a storage device deduplication operation. For example, host device 102 may send a storage command 222 to storage device 120 specifying a target host data unit to read or write. Storage device 120 may be configured to perform deduplication for all write and/or read operations or selectively based on a deduplication parameter that may be included with storage command 222. For example, the target host data unit of the read or write operation may be used as a deduplication target and storage device 120 may scan for duplicates of the target host data unit before completing the storage operation specified in storage command 222. In some embodiments, host device 102 may use a deduplication operation 230, such as a dedicated command for performing host data deduplication, to initiate a storage device deduplication operation. For example, host device 102 may send a deduplication command 232 to storage device 120 specifying the scope of a deduplication operation to be initiated by storage device 120. In some embodiments, deduplication command 232 may initiate a process of systematically scanning all host data on storage device 120 or a defined subset of that host data to determine one or more host data units that are duplicated and reduce the number of duplications in accordance with deduplication rules of policy. One or more parameters defining the selection of target data units to be deduplicated may be included with deduplication command 232 or stored in in-device deduplication configuration 214.

Storage device 120 may invoke deduplication engine 240 for executing one or more deduplication operations for a selected target data unit. In some embodiments, deduplication engine 240 may be configured to read or otherwise determine a target data unit and scan encoded host data to find one or more duplicates. For example, deduplication engine 240 may compare the encoded target data unit against a plurality of encoded comparison data units to determine similarity values and determine duplicates based on comparing the similarity values to a similarity threshold. In some embodiments, deduplication engine 240 may be configured to use a bit-by-bit comparison of the encoded data units to determine the similarity score based on the number of bits that do not match. For example, deduplication engine 240 may use an exclusive- or (XOR) logic that returns a value of 1 for each pair of bits that are not equal and a 0 for pairs that are equal, then sums those returned values across all bits in the encoded data units being compared. In some embodiments, storage device 120 may leverage latch logic within the memory controller of storage device 120 to efficiently process the bit-by-bit comparisons in close proximity to the NVM media that stores the encoded host data.

For example, deduplication engine 240 may read and/or encode the target host data into latch layer 1 242. If the target host data is received from host device 102 to initiate the deduplication operation it may need to be encoded using storage device error correction codes (ECC) prior to being placed in a first side of a latch register. If the target host data is read from the NVM media in the storage device it may be ECC encoded as it comes out of the media and can be read directly into the first side of the latch register.

Deduplication engine 240 may then scan encoded data 250. Host data selected for comparison may be read into latch layer 2 252. Deduplication engine 240 may include logic for determining the selection of encoded comparison data units, such as using host metadata to select data units of similar size, type, etc. and scan encoded data 250 may iterate through each encoded comparison data unit selected. For example, each encoded comparison data unit may be read into latch layer 2 252 and processed through scan encoded data 250 while the encoded target data unit remains in latch layer 1. A bit-by-bit XOR comparison of the latches 254 may be executed against the paired bits between latch layer 1 and latch layer 2. Each bit comparison may generate a count of unequal or different bits that may be summed to determine similarity value 256. In some embodiments, determine similarity value 256 may include a more complex evaluation of bit differences, such as characterization of bit difference patterns, bit differences as a percentage of total bits in the data unit, etc, to determine a similarity value. The similarity value may be compared to similarity threshold 258 to determine whether the compared data units are similar enough to be considered duplicates. The similarity threshold may be determined to allow for bit differences at least reflective of the bit errors the ECC encoding would correct for the data units. For example, the similarity threshold may be based on an expected bit error rate associated with the media storing the host data units. Additional allowable similarity value differences for determining duplicates, such as anticipated differences based on data formats, metadata tagging, etc., may also be used to determine the similarity threshold. Encoded comparison data units with similarity values exceeding the similarity threshold may be determined different and encoded comparison data units with similarity values less than or meeting the similarity threshold may be considered duplicates or potential duplicates.

Deduplication engine 240 may include further logic to collect and classify duplicates or potential duplicates from scan of encoded data 250 to determine duplicates 260. For example, a number of potential duplicates under the similarity threshold may be further evaluated based on hash evaluation (further described with regard to FIG. 3), metadata evaluation, cross-comparison, or other secondary duplicate analysis to determine one or more duplicates for processing according to duplicate policy 216. In some embodiments, deduplication engine 240 may be configured to enforce duplicate policy 216, eliminate extra duplicates and notify the host 262. For example, duplicate policy 216 may allow only a single copy and all determined duplicates may be deleted using in-device delete operations until a single copy remains or a write operation for a new copy may be discarded rather than being processed. In some embodiments, the LBAs of the deleted duplicates may be mapped to the remaining copy by storage device 120.

In some embodiments, deduplication engine 240 may be configured to notify host device 102 of duplicates and/or elimination of duplicates. For example, storage device 120 may send a duplicate or elimination notification 264 to host device 102 that identifies each duplicate data unit determined at determine duplicates 260 and/or any elimination actions taken by storage device 120, such as rejection or a write command or one or more delete operations. In some embodiments, deduplication engine 240 merely notifies host device 102 of determined duplicates and any further action, such as secondary evaluation of duplicate status and/or responsive storage operations (delete commands) may be initiated by host device 102. Host device 102 may include a deduplication response handler 266 configured to process the deduplication information received from storage device 120. For example, deduplication response handler 266 may include logic for updating LBA and other information related to elimination actions by storage device 120 and/or additional duplicate evaluation and duplicate policy logic to generate further storage operations, such as delete commands targeting duplicate data units.

Figure 3:
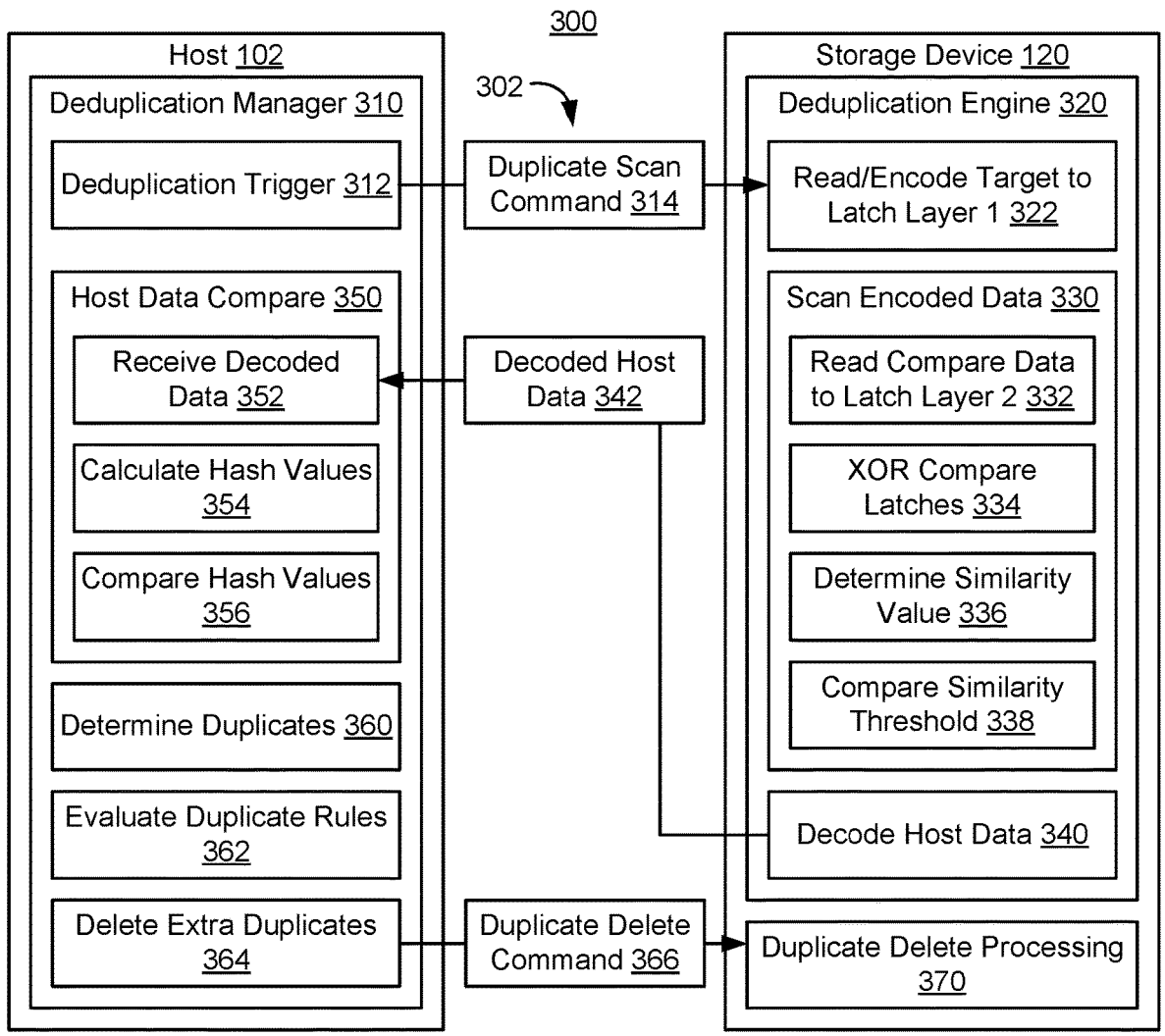
FIG. 3 schematically illustrates a shared deduplication process that may be used by the storage system of FIG. 1.

FIG. 3 shows a schematic representation of a shared deduplication process between host device 102 and storage device 120 in storage system 300. In some embodiments, storage system 300 may be implemented in storage system 100 of FIG. 1 and/or incorporate features from storage system 200 in FIG. 2. Host device 102 may be configured for communication with storage device 120, such as through a storage interface similar to storage interface 110 in FIG. 1. In some embodiments, communications 202 may include messages passed between host device 102 and storage device 120. For example, host device 102 and storage device 120 may support bi-directional packetized communication using a master-slave or multi-master configuration over a communication bus or network connection between them. In the embodiment shown, host device 102 includes a deduplication manager 310 configured to manage a deduplication process that includes one or more deduplication operations executed by storage device 120 to identify duplicates from encoded host data before decoding and returning the duplicates to host device 102 for further processing. For example, deduplication manager 310 may be utility or service of storage manager 114 or a deduplication application in applications 112 of FIG. 1 that utilizes deduplication engine 320 for a first level of duplicate processing before further processing the returned host data results.

Deduplication manager 310 may include a deduplication trigger 312 configured to initiate deduplication operations using deduplication engine 320 in storage device 120. For example, deduplication trigger 312 may receive user requests to initiate deduplication of host data units in storage device 120 and/or include rules or logic for initiating deduplication operations based on a schedule and/or event-based tiggers. In some embodiments, deduplication trigger may generate a duplicate scan command 314 and send it to storage device 120. For example, duplicate scan command 314 may include command parameters indicating target data units for deduplication, such as a complete scan of host data units in storage device 120 or selected portions thereof, such as a namespace or zone. In some embodiments, duplicate scan command 314 may include one or more target host data units and/or the host LBAs for those data units (which may be used by storage device 120 to retrieve those data units). In some embodiments, duplicate scan command 314 may specify a set of metadata parameters for identifying target data units. For example, file type (video files, audio files, image files, etc.), data format, data size, operation timestamps, ownership/access, object parameters, etc. may be used to define a set of host data units having similar characteristics and targeted for deduplication.

Deduplication engine 320 may select a host data unit meeting the target criteria as a target data unit for a deduplication operation. In some embodiments, deduplication engine 320 may operate similarly to deduplication engine 240 in FIG. 2. The target data unit may be read into latch layer 1 322 as an encoded target data unit read from storage medium or received in duplicate scan command 314. Scan encoded data 330 may select comparison host data units based on selection criteria provided by duplicate scan command 314 and/or determined from the target data unit (e.g., using size and data type of the target data unit to identify comparison data units). Each comparison data unit may be read into latch layer 2 332 as an encoded comparison data unit read from the storage medium. A XOR compare between latches 334 may be used to determine whether corresponding bits between the target data unit and the comparison data unit are equal or unequal. Deduplication engine 320 may determine a similarity value 336 and compare the similarity value to a similarity threshold 338. A set of encoded duplicates may be determined by processing each comparison data unit through scan encoded data 330. Deduplication engine 320 may decode the host data units 340 using storage device ECC and return them to host device 102 as decoded host data 342 for further processing. The device-determined set of duplicates may be returned in on or more response or notification messages to host device 102 and/or use another host data channel, such as RDMA access to a data transfer buffer, to move decoded host data 342 from storage device 120 to host device 102. In some embodiments, deduplication engine 320 may further process duplicate data units identified by scan encoded data 330 prior to returning them to host device 102.

Deduplication manager 310 may be configured to receive decoded host data 342 and execute a secondary host data compare 350 to determine whether the duplicates detected by deduplication engine 320 meet the host's definition of duplicates. For example, host device 102 may require a hash comparison of the decoded host data to verify duplicates returned by storage device 120. Host data compare 350 may receive decoded data 352 to a data buffer or other memory location within host device 102. For example, receive decoded data 352 may allocate a data transfer buffer memory space to receive the host data units in the set of device-determined duplicates. Host data compare 350 may calculate a hash value 354 for the target data unit and each corresponding duplicate data unit. In some embodiments, host data compare 350 may access previously calculated hash values for one or more host data units to avoid recalculating hash values that have been previously calculated. Host data compare 350 may compare the calculated hash values 356 to verify the device-determined duplicates meet the host's duplicate criteria, such as identical hash values. In some embodiments, compare hash values 356 may be based on a sampling of hash values rather than a full hash value comparison.

Deduplication manager 310 may determine a host-determined set of duplicates 360 for evaluation and elimination based on a deduplication policy. The set of host-determined duplicates may result in a count or number of duplicate copies for each target data unit. The number of duplicate copies may be used to evaluate duplicate rules 362 to determine an acceptable number of duplicates and compare the number of duplicate copies in storage device 120 to the acceptable number. Evaluate duplicate rules 362 may generate a count and/or identification of specific LBAs corresponding to extra duplicates that are not needed. In some embodiments, host device 102 may apply duplicate rules 362 to sets of host-determined duplicates for the same target host data unit on multiple storage devices. Deduplication manager 310 may delete extra duplicates 364 by generating and sending delete commands to storage device 120. For example, delete extra duplicates 364 may receive or determine host LBAs for extra duplicates and send duplicate delete command 366 to storage device 120. In some embodiments, duplicate delete command 366 may include a list of host LBAs corresponding to duplicates to be deleted and/or a separate duplicate delete command 366 may be sent for each host data unit to be deleted. Duplicate delete processing 370 of storage device 120 may process the delete commands to delete the identified duplicate host data units from the storage medium of storage device 120.

Figure 4:
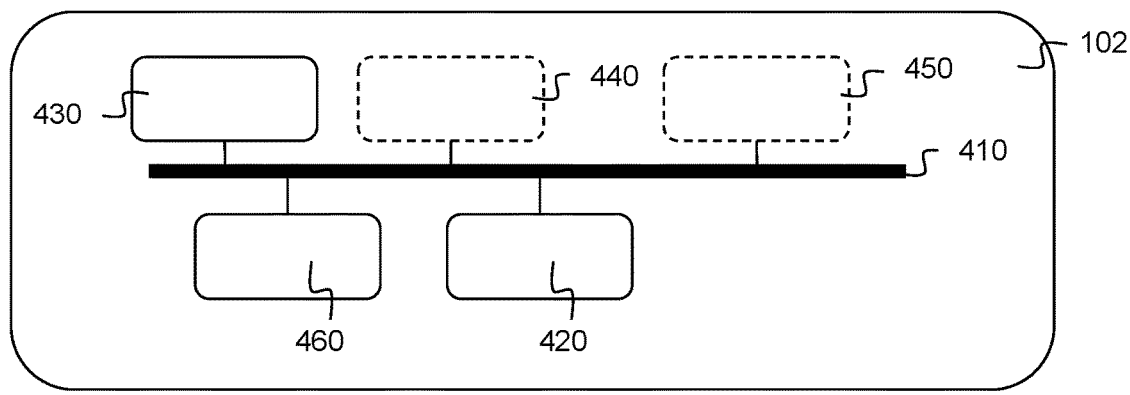
FIG. 4 schematically illustrates a host device of the storage system of FIG. 1.

FIG. 4 shows a schematic representation of an example host device 102. Host device 102 may comprise a bus 410, a host processor 420, a host memory 430, one or more optional input units 440, one or more optional output units 450, and a communication interface 460. Bus 410 may include one or more conductors that permit communication among the components of host 102. Processor 420 may include any type of conventional processor or microprocessor that interprets and executes instructions. Host memory 430 may include a random access memory (RAM) or another type of dynamic storage device that stores information and instructions for execution by processor 420 and/or a read only memory (ROM) or another type of static storage device that stores static information and instructions for use by processor 420 and/or any suitable storage element such as a hard disc or a solid state storage element. For example, deduplication configuration 210, storage operations 220, deduplication operations 230, and/or deduplication response handler 266 in FIG. 2 and/or deduplication manager 310 in FIG. 3 may be instantiated in instructions, operations, or firmware stored in host memory 430 for execution by host processor 420. An optional input unit 440 may include one or more conventional mechanisms that permit an operator to input information to host 102 such as a keyboard, a mouse, a pen, voice recognition and/or biometric mechanisms, etc. In some embodiments, optional input unit 440 may include image, audio, infrared, and/or other sensors for video camera or other consumer electronics functions. Optional output unit 450 may include one or more conventional mechanisms that output information to the operator or user, such as a display, a printer, a speaker, etc. Communication interface 460 may include any transceiver-like mechanism that enables host 102 to communicate with other devices and/or systems. In some embodiments, communication interface 460 may include one or more peripheral interfaces, such as a PCIe, USB, SD, SDXC, or other interfaces for connecting to storage device 120 and/or a network interface for communicating with storage device 120 over a fabric network.

Figure 5:
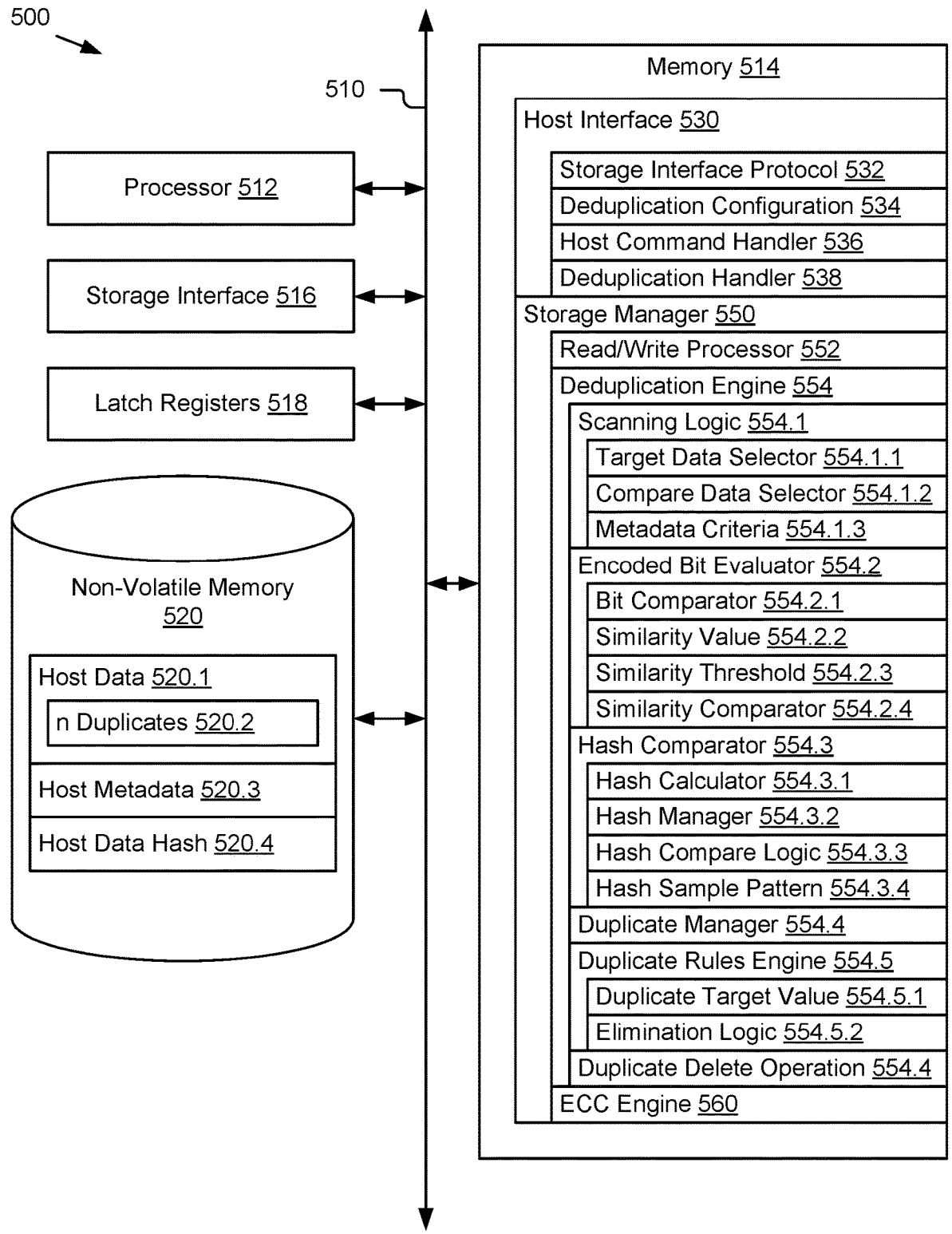
FIG. 5 schematically illustrates some elements of the storage device of FIG. 1-3 in more detail.

FIG. 5 schematically shows selected modules of a storage device 500 configured for storage device deduplication operations using encoded host data. Storage device 500 may incorporate elements and configurations similar to those shown in FIGS. 1-3. For example, storage device 500 may be a storage device configured as storage device 120 in storage system 100, where the storage device includes bus 510, processor 512, memory 514 (instantiating host interface 530 and storage manager 550), storage interface 516, and latch registers 518 in storage device controller 130 and non-volatile memory 520 in NVM devices 140.

Storage device 500 may include a bus 510 interconnecting at least one processor 512, at least one memory 514, and at least one interface, such as storage interface 516. Bus 510 may include one or more conductors that permit communication among the components of storage device 500. Processor 512 may include any type of processor or microprocessor that interprets and executes instructions or operations. Memory 514 may include a random access memory (RAM) or another type of dynamic storage device that stores information and instructions for execution by processor 512 and/or a read only memory (ROM) or another type of static storage device that stores static information and instructions for use by processor 512 and/or any suitable storage element such as a hard disk or a solid state storage element.

Storage interface 516 may include a physical interface for communication between a storage device and a host or client using an interface protocol that supports storage device access. For example, storage interface 516 may include a USB, SD, SDXC, PCIe, serial advanced technology attachment (SATA), serial attached small computer system interface (SCSI) (SAS), fibre channel, or similar storage interface connector supporting access to solid state media comprising non-volatile memory devices 520. In some embodiments, storage interface 516 may connect to or incorporate a network interface for connecting to a fabric network and/or other network. For example, storage interface 516 may connect to a network fabric interface through a backplane network and/or storage network interface controller supporting an NVMe-over-fabric (NVMeoF) protocol. In some embodiments, storage devices, hosts, clients, and/or other components of storage system 500 may be configured as nodes in the NVMeoF topology and communicate using supported NVMe commands, such as NVMe telemetry commands.

Latch registers 518 may include a latch subsystem for holding a series of bit data read from non-volatile memory 520. In some embodiments, latch registers 518 may be part of the memory channel interconnecting the storage device controller and media devices storing the host data. Latch registers 518 may be configured to receive data bits read from non-volatile memory 520 prior to applying ECC decoding (such as decode processing through ECC engine 560). In some embodiments, latch registers 518 may be configured in latch layers where each latch layer may receive a series of bit values. Latch layers may be arranged in parallel and enable bit values to be paired and compared between or across layers. For example, bit 1 of layer 1 may be compared to bit 1 of layer 2, bit 2 of layer 1 may be compared to bit 2 of layer 2, bit 3 of layer 1 may be compared to bit 3 of layer 2, etc. across all corresponding bit pairs. In some embodiments, additional latch layers may also be selectively compared such that data in latch layer 1 may be compared against data in latch layer 2, then latch layer 3, then latch layer 4, etc. In some embodiments, latch registers 518 may reside within the memory devices of non-volatile memory 520.

Storage device 500 may include one or more non-volatile memory devices 520 configured to store host data 520.1. For example, non-volatile memory devices 520 may include a plurality of flash memory packages organized as an addressable memory array. In some embodiments, non-volatile memory devices 520 may include NAND or NOR flash memory devices comprised of single level cells (SLC), multiple level cell (MLC), or triple-level cells. In some embodiments, non-volatile memory devices 520 may include the storage medium of a storage device, such as NVM devices 140 in storage devices 120.

Storage system 500 may include a plurality of modules or subsystems that are stored and/or instantiated in memory 514 for execution by processor 512 as instructions or operations. For example, memory 514 may include a host interface 530 configured to receive, process, and respond to host data requests and/or management commands from client or host systems. Memory 514 may include storage manager 540 configured to manage storage and management operations to the media devices comprising non-volatile memory 520.

Host interface 530 may include an interface protocol and/or set of functions, parameters, and/or data structures for receiving, parsing, responding to, and otherwise managing host data requests from a host. For example, host interface 530 may include functions for receiving and processing host requests for reading, writing, modifying, or otherwise manipulating data blocks and their respective client or host data 520.1 and/or metadata 520.3 in accordance with host communication and storage protocols. Host interface 530 may also support administrative commands and/or management operations initiated by the host or the storage device, such as configuration changes, garbage collection, log access, firmware management, reporting of operational parameters, deduplication operations, etc. For example, host interface 530 may support administrative command sets for configuring namespaces, queue control, log access, feature identification and configuration, security settings, and/or performance monitoring. In some embodiments, host interface 530 may enable direct memory access and/or access over NVMe protocols through storage interface 516. For example, host interface 530 may include host communication protocols compatible with USB, SD, SDXC, PCIe, SATA, SAS, and/or another bus interface. Host interface 530 may further include deduplication interface protocols compatible with configuring and enabling in-device duplicate detection and/or deduplication with varying levels of host support. For example, host interface 530 may enable configuration of in-device deduplication operations on a periodic, event-based, or host-response basis, such as within host storage command processing or responsive to a deduplication command, and handle host data and/or notifications provided to a host or client node in response to deduplication operations.

In some embodiments, host interface 530 may include a plurality of hardware and/or software modules configured to use processor 512 and memory 514 to handle or manage defined operations of host interface 530. For example, host interface 530 may include a storage interface protocol 532 configured to comply with the physical, transport, and storage application protocols supported by the host for communication over storage interface 516. For example, storage interface protocol 532 may include USB, SD, SDXC, PCIe, NVMe, and/or other protocol compliant communication, command, and syntax functions, procedures, and data structures. In some embodiments, host interface 530 may include a deduplication configuration 534 configured to provide default deduplication parameters and/or receive deduplication parameters from a host to configure deduplication engine 554. In some embodiments, host interface 530 may include a host command handler 536 configured to receive and parse host commands, such as storage commands and/or deduplication commands, for execution by storage manager 550. In some embodiments, host interface 530 may include a deduplication handler 538 configured to notify the host of deduplication operations and outcomes, sometimes including the return of host data. In some embodiments, host interface 530 may include additional modules (not shown) for input/output (I/O) commands, buffer management, storage device configuration and management, and other host-side functions.

In some embodiments, deduplication configuration 534 may be configured to include a set of configuration parameters for selectively determining the operation of deduplication engine 554 to provide in-device duplicate identification and processing. For example, duplication configuration 534 may include a default set of configuration parameter values describing the capabilities and default settings of deduplication engine 554. In some embodiments, deduplication configuration 534 may support host queries to determine the current parameter settings and/or supported ranges and functions for those settings. For example, a configuration read command may be received and parsed by host command handler 536 and return one or more configuration values. In some embodiments, deduplication configuration 534 may be used to configure the logic and parameters used by deduplication engine 554. For example, deduplication configuration 534 may include a configuration page, file, or database that includes deduplication trigger rules, target and comparison selection criteria, metadata criteria, similarity value calculators, similarity threshold calculators, hash calculators, hash sampling patterns, duplicate rules, and other parameters related to the operation of deduplication engine 554.

In some embodiments, host command handler 536 may include an interface and/or communication event-based condition for receiving data requests and/or operational commands from one or more hosts. Host command handler 536 may receive these requests and parse them according to the appropriate communication and storage protocols. For example, host command handler 536 may identify a transaction identifier, a data unit identifier (LBA, object name, globally unique identifier (GUID), etc.), a data operation, and additional parameters for the data operation, if any, from the received message or messages that make up the host command. Similarly, operational commands, such as deduplication commands, may include syntax and parameters for determining the scope, targets, priority, response conditions, etc. for the operational commands.

In some embodiments, deduplication handler 538 may be configured to manage the host response for deduplication operations executed by deduplication engine 554. For example, once host command handler 536 has initiated a deduplication operation responsive to a storage command or a deduplication command, deduplication handler 538 may wait for the deduplication operation to complete and provide a corresponding response to the host. In some embodiments, deduplication configuration 534 and deduplication engine 554 may include deduplication operations initiated by storage device 500 without a corresponding host command and deduplication handler 538 may be configured to respond to completion of those operations and provide corresponding messages to the host. For example, deduplication handler 538 may be configured to return a list of device-determined duplicates and/or actions taken responsive to determining the duplicates (such as deletion of a subset of those duplicates). In some embodiments, deduplication handler 538 may transfer one or more host data units from the set of device-determined duplicates to the host for further processing.

Storage manager 550 may include an interface protocol and/or set of functions, parameters, and data structures for reading, writing, and deleting host data units in non-volatile memory devices 520. For example, storage manager 550 may include a read/write processor 552 for executing host data operations related to host storage commands received through host interface 530 and host command handler 536. For example, PUT or write commands may be configured to write host data units to non-volatile memory devices 520 through a write processor. GET or read commands may be configured to read data from non-volatile memory devices 520 through a read processor. DELETE commands may be configured to delete data from non-volatile memory devices 520, or at least mark a data location for deletion until a future garbage collection or similar operation actually deletes the data or reallocates the physical storage location to another purpose. In some embodiments, storage manager 550 may include flash translation layer (FTL) management, data state machine, read/write buffer management, garbage collector, NVM device interface protocols, NVM device management, and other device-side functions. Storage manager 550 may include various functions that generate operational parameters, such as workload data, error rates, configuration parameters, physical parameters, storage parameters (e.g., aggregate storage space used/available/marked for garbage collection, wear leveling statistics, etc.), error logs, event logs, and other operational parameters that may be aggregated and reported through various interfaces, functions, or services. In some embodiments, storage manager 550 may include deduplication engine 554 and ECC engine 560 for supporting deduplication operations and other storage operations.

In some embodiments, storage manager 550 may include deduplication engine 554 configured to execute in-device deduplication operations. For example, deduplication engine 554 may be initiated by host command handler 536 in response to one or more storage commands and/or deduplication commands. In some embodiments, deduplication engine 554 may include one or more deduplication triggers that operate in conjunction with host commands or independent from them. For example, deduplication configuration 534 may define deduplication trigger rules based on a schedule (e.g., periodic deduplication scans), operating condition (idle time operations reaching a priority assigned to deduplication), and/or storage parameters (available storage capacity dropping below a capacity threshold). In some embodiments, host storage commands may include a deduplication flag or parameter that triggers deduplication engine 554 to execute a deduplication operation for the host data unit targeted by the storage operation. For example, a host write operation may trigger a deduplication operation to determine whether the target data unit is already stored (and/or is stored in a number of copies at or above a duplicate target) before writing the new copy (and may discard the write operation if the duplicate is not within the duplicate policy. As another example, a host read operation may trigger a deduplication operation to determine whether the target data unit is stored in multiple copies and, if the number of copies exceeds the duplicate policy, eliminate one or more extra copies.

A deduplication operation may include at least one target data unit and a scan of one or more stored data units for comparison. Deduplication engine 554 may include scanning logic 554.1 configured to scan encoded host data 520.1 in non-volatile memory 520 for encoded host data pairs to compare for similarity. For example, for any host data unit, encoded host data 520.1 may include n duplicates 520.2, where a duplicate is defined as a host data unit that has a similarity to another host data unit sufficient that the two host data units are functionally equivalent, and scanning logic 554.1 may be configured to select a target host unit and a set of comparison host units for comparison by deduplication engine 554.

Scanning logic 554.1 may include a target data selector 544.1.1 configured to determine the host data unit to be compared against other host data units. For example, target data selector 544.1.1 may receive a target data unit that is included in or indicated by a host command. In some embodiments, target data selector 544.1.1 may include logic for selecting targets for drive-initiated deduplication operations and/or deduplication operations indicating a plurality of host data units, such as a zone or data type. For example, target data selector 544.1.1 may include criteria for determining a list of target candidates based on LBA, storage parameters, and/or host metadata characteristics and randomizing and/or generating and sorting a queue for systematically running deduplication operations against each target data unit in the list. In some embodiments, scanning logic 554.1 may include similar logic for a compare data selector 544.1.2 configured to determine the set of comparison data units to be compared to the target data unit. For example, compare data selector 544.1.2 my include criteria for selecting and organizing host data units for sequential comparison to the target data unit. In some embodiments, target data selector 544.1.1 and/or compare data selector 544.1.2 may include or access metadata criteria 544.1.3 that may define a set of metadata parameters for selecting target and/or comparison data units. For example, host metadata 520.3 may include one or more data stores and/or data tables describing host data units and target data selector 544.1.1 and/or compare data selector 544.1.2 may query host metadata 520.3 using metadata criteria 544.1.3 to generate a target set and/or comparison set of host data units. In some embodiments, scanning logic 554.1 may return at least one target data unit and at least one comparison data unit (by LBA or other identifier) for deduplication engine 554 to compare.

In some embodiments, deduplication engine 554 may include an encoded bit evaluator 554.2 configured to read encoded data units from non-volatile memory 520 and compare them bit-by-bit to determine their similarity (based on matching bit pairs between the compared data units). For example, encoded bit evaluator 554.2 may read encoded host data units into a register or other memory space without decoding the data units using ECC engine 560. In some embodiments, latch registers 518 may be used to hold the target and compare data units for comparison, as described above with regard to deduplication engine 240 in FIG. 2 and deduplication engine 320 in FIG. 3. A bit comparator 554.2.1 may be configured to compare bit pairs between the target data unit and the comparison data unit to determine whether the bits are equal or unequal. For example, a XOR operation may return a count for each unequal set of bits. Encoded bit evaluator 554.2 may calculate a similarity value 554.2.2. For example, encoded bit evaluator 554.2 may sum the count of unequal bits returned by bit comparator 554.2.1 to determine similarity value 554.2.2. Encoded bit evaluator 554.2 may compare similarity value 554.2.2 to a similarity threshold 554.2.3 using a similarity comparator 554.2.4. For example, the sum of unequal bits may be compared to a threshold value determined from a predicted error rate for the host data by similarity comparator 554.2.4 and return comparison data units that do not exceed the threshold value. As discussed above, other configurations for determining similarity value 554.2.2, similarity threshold 554.2.3, and how they are compared are possible, such as patterns, percentages, dynamic thresholds, and/or relative values across a set of comparison data units to determine an acceptable number of bit errors or differences in the comparison. In some embodiments, encoded bit evaluator 554.2 may return a set of duplicate host data units based on bit comparison of encoded host data. In some embodiments, the set of duplicate host data units may be directed through ECC engine 560 for decoding and a set of decoded duplicate host data units may be returned.

In some embodiments, deduplication engine 554 may use the duplicates determined by encoded bit evaluator 554.2 for duplicate processing. The duplicates determined from the encoded data may be identified to duplicates manager 554.4 and/or duplicate rules engine 554.5 for handling the duplicates and determine responsive actions, such as elimination of unneeded duplicates. In some embodiments, duplicates determined by encoded bit evaluator 554.2 may be returned as results from deduplication engine 554 and returned to the host for further processing through deduplication handler 538. For example, the host may receive the decoded host data blocks, execute secondary duplicate verification, and determine responses based on its own duplicate policy, as described with regard to FIG. 3. In some embodiments, deduplication engine 554 may be configured for secondary processing and/or duplicate verification, such as by hash comparator 554.3.

Hash comparator 554.3 may be configured to use hashes of the decoded host data units for an additional comparison to confirm that duplicates determined by encoded bit evaluator 554.2 meet a defined standard for duplicates. For example, hash comparator 554.3 may receive a set of duplicate data units identified by encoded bit evaluator 554.2, such as a list of host LBAs or the decoded data units themselves. Hash comparator 554.3 may include a hash calculator 554.3.1 configured to calculate a hash value for each host data unit based on a hashing algorithm. For example, hash calculator 554.3.1 may apply a hash function to each data unit to generate a fixed-length and unique hash value that can be compared to the hash values generated for each other duplicate. Hash comparator 554.3 may include a hash manager 554.3.2 configured to store calculated hash values to be reused across comparisons. For example, the hash value of the first duplicate, such as the target data unit, may be stored in a data structure in host data hash 520.4 in non-volatile memory 520 and used for compare operations with each other hash value. In some embodiments, hash values may be calculated and stored in host data hash 520.4 by a hash calculator in the host device and/or retained between deduplication operations to reduce the occurrence of hash calculations by storage device 500. Hash comparator 554.3 may include hash compare logic 554.3.3 configured to compare the hash value of the target data unit to each other duplicate data unit and/or every combination of duplicate data units to confirm that the corresponding host data units are identical. In some embodiments, hash comparator 554.3 may be configured to use a subset of each host data unit for calculating the hash. For example, hash comparator 554.3 may include a hash sample pattern 554.3.4 that determines a selected set of data blocks (aligned with the block size of the hashing function) from defined positions in each host data unit for hash calculator 554.3.1. Hash comparator 554.3 may return a set of verified duplicate host data blocks based on the duplicate data units determined by host comparator 554.3 to have identical hash values. In some embodiments, the set of verified duplicate host data units may processed through duplicate rules engine 554.5 to determine further action.

In some embodiments, deduplication engine 554.4 may include a duplicate manager 554.4 configured to aggregate information regarding duplicates, such as identifiers for duplicates from encoded bit evaluator 554.2 and/or verified duplicates from hash comparator 554.3. For example, duplicate manager 554.4 may include a data structure and/or fields in host metadata 520.3 to identify known duplicates. Deduplication engine 554 may use duplicate manager 554.4 to reduce recalculation of duplicates and support other operations of deduplication engine 554. In some embodiments, duplicate manager 554.4 may provide a data source for duplicate rules engine 554.5.

Duplicate rules engine 554.5 may be configured to process one or more rule sets for determining actions responsive to determination of duplicates by encoded bit evaluator 554.2 and/or hash comparator 554.3. For example, duplicate rules engine 554.5 may use parameters corresponding to the set of duplicate host data units to evaluate logical rules for determining whether one or more duplicates should be eliminated. In some embodiments, duplicate rules engine 554.5 may use a duplicate target value 554.5.1, defining the number of copies that may be acceptably retained in storage device 500, from deduplication configuration 534 to determine responsive actions. For example, duplicate rules engine 554.5 may determine a number of duplicates in the set of duplicates for a target host data unit and compare the number of duplicates to duplicate target value 554.5.1. The amount by which the number of duplicates exceeds the duplicate target value may determine an elimination number of duplicate host data units to be deleted. In some embodiments, duplicate rules engine 554.5 may include dynamic rules for generating duplicate target value 554.5.1 for a specific host data unit, such as based on the age, type, use, and other parameters of the duplicate data units for that host data unit. Duplicate rules engine 554.5 may also include elimination logic 554.5.2 for selecting corresponding elimination actions based on the duplicate data units to be eliminated, the trigger conditions for the deduplication operation (such as read command, write command, deduplication command, deduplication background process, etc.). For example, elimination of a write command may include discarding the write command from a command processing queue. Elimination of one or more duplicate data units from host data 520.1 may include selecting which copies to delete and when and elimination logic 554.5.2 may further include logical rules related to selecting deletion targets and scheduling duplicate delete operations 554.4.

Duplicate delete operations 554.4 may use storage manager 550 to initiate delete processes targeting duplicate host data units. For example, a delete operation may be added to a storage command processing queue as if a delete command had been received from the host. In some embodiments, storage device 500 may execute duplicate delete operations 554.4 as a result of deduplication operations executed by deduplication engine 554 without further intervention from the host. In some embodiments, host data units identified for duplicate delete operation 554.4 may be reported to the host and may include a delay and/or require confirmation from the host prior to executing duplicate delete operation 554.4.

ECC engine 560 may include an interface and set of functions, parameters, and data structures for storing, reading, and otherwise managing data ECC encoded by storage device 500, such as erasure encoded data blocks stored in non-volatile memory 520. For example, ECC engine 560 may include functions for encoding a host data block into a storage device ECC encoded data block and decoding a storage device ECC encoded data block back into the original host data symbol. In some embodiments, ECC engine 560 may be included in the write path and/or read path for non-volatile memory 520 that is managed by storage manager 550. In some embodiments, the encoding and decoding functions may be placed in separate encoding engines and decoding engines with redundant and/or shared functions where similar functions are used by both encoding and decoding operations.

Erasure coding configuration may include functions, parameters, and/or logic for determining the operations used to encode and decode those host data blocks in accordance with a storage device ECC configuration. For example, various ECC coding algorithms exist for providing forward error correction based on transforming a message of a certain number of symbols into a longer message of more symbols such that the original message can be recovered from a subset of the encoded symbols and related parity data. In some embodiments, a message may be split into a fixed number of symbols and these symbols are used as input for ECC coding. The ECC coding algorithm may generate a fixed amount of additional parity data or parity symbols. The sum of these symbols may then be stored to one or more storage locations. ECC engine 560 may be configured with at least one ECC coding algorithm using a set of coding parameters. For example, coding algorithms may enable selection of an algorithm type, such as parity-based, low-density parity-check codes, Reed-Solomon codes, etc., and one or more coding parameters, such as number of original symbols, number of encoded symbols, code rate, reception efficiency, parity level, etc. ECC engine 560 may include hardware and/or software encoders and decoders for implementing error coding. For example, ECC engine 560 may include a plurality of register-based encoders and decoders for calculating parity for a symbol and returning ECC encoded data symbols.

Figure 6:
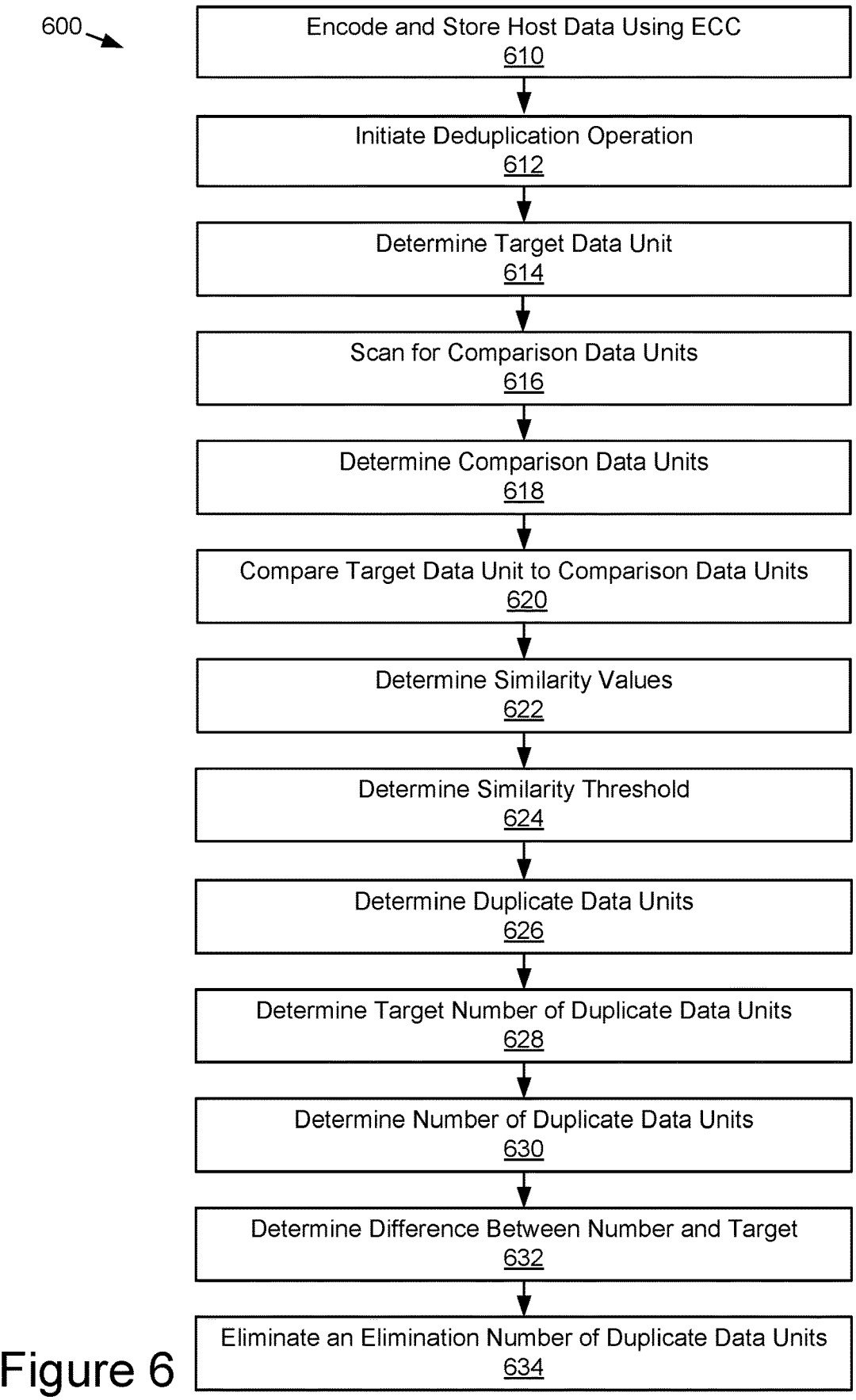
FIG. 6 is a flowchart of an example method of deduplication using in-device comparison of encoded host data.

As shown in FIG. 6, storage device 500 may be operated according to an example method for deduplication using in-device comparison of encoded host data, i.e. according to method 600 illustrated by blocks 610-634 in FIG. 6.

At block 610, host data from a host device may be encoded and stored using storage device ECC. For example, a host interface may receive read, write, and delete commands from the host device to manipulate host data stored by the storage device, where the storage device encodes data stored to its storage medium for write commands and decodes data stored on its storage medium for read commands.

At block 612, a deduplication operation may be initiated. For example, a deduplication engine may be initiated by a storage manager in response to host commands and/or internal trigger conditions for performing a duplicate identification for one or more host data units.

At block 614, a target data unit may be determined. For example, the deduplication engine may receive or determine a host data unit to be compared against other host data units to identify duplicates.

At block 616, host data may be scanned for comparison data units. For example, the deduplication engine may use parameters from the target data unit to determine a set of previously stored host data units that are possible duplicates of the target data unit, such as by querying or processing host metadata.

At block 618, a set of comparison data units may be determined. For example, the deduplication engine may determine a set of host data units at block 618 to be compared to the target data unit.

At block 620, the target data unit may be compared to each of the comparison data units. For example, the deduplication engine may compare each bit of the encoded target data unit to each bit of a comparison data unit to determine which bit are equal and which bits are unequal.

At block 622, similarity values may be determined for each comparison data unit. For example, the deduplication engine may sum the number of unequal bits to determine a similarity value.

At block 624, a similarity threshold may be determined. For example, the deduplication engine may receive a configuration parameter for the similarity threshold and/or determine the similarity threshold based on a dynamic parameter, such as a bit error rate corresponding to the storage medium or comparison data unit.

At block 626, duplicate data units may be determined. For example, the deduplication engine may compare the similarity values to the similarity threshold and comparison data units with similarity values below or meeting the similarity threshold may be determined to be duplicates of the target data unit.

At block 628, a target number of duplicate data units may be determined. For example, the deduplication engine may be configured with a number of allowable duplicates and/or include an algorithm or set of rules for dynamically determining the number of allowable duplicates for a particular host data unit.

At block 630, a number of duplicate data units may be determined. For example, the deduplication engine may determine a count of the duplicate data units determined at block 626.

At block 632, a difference between the number of duplicate data units and the target number may be determined. For example, the deduplication engine may subtract the target number from the actual number of duplicate data units for the host data unit and a positive result may indicate an elimination number of duplicate data units that exceed the target number.

At block 634, the elimination number of duplicate data units may be eliminated. For example, the deduplication engine may initiate delete operations targeting duplicate data units equal to the elimination number.

Figure 7:
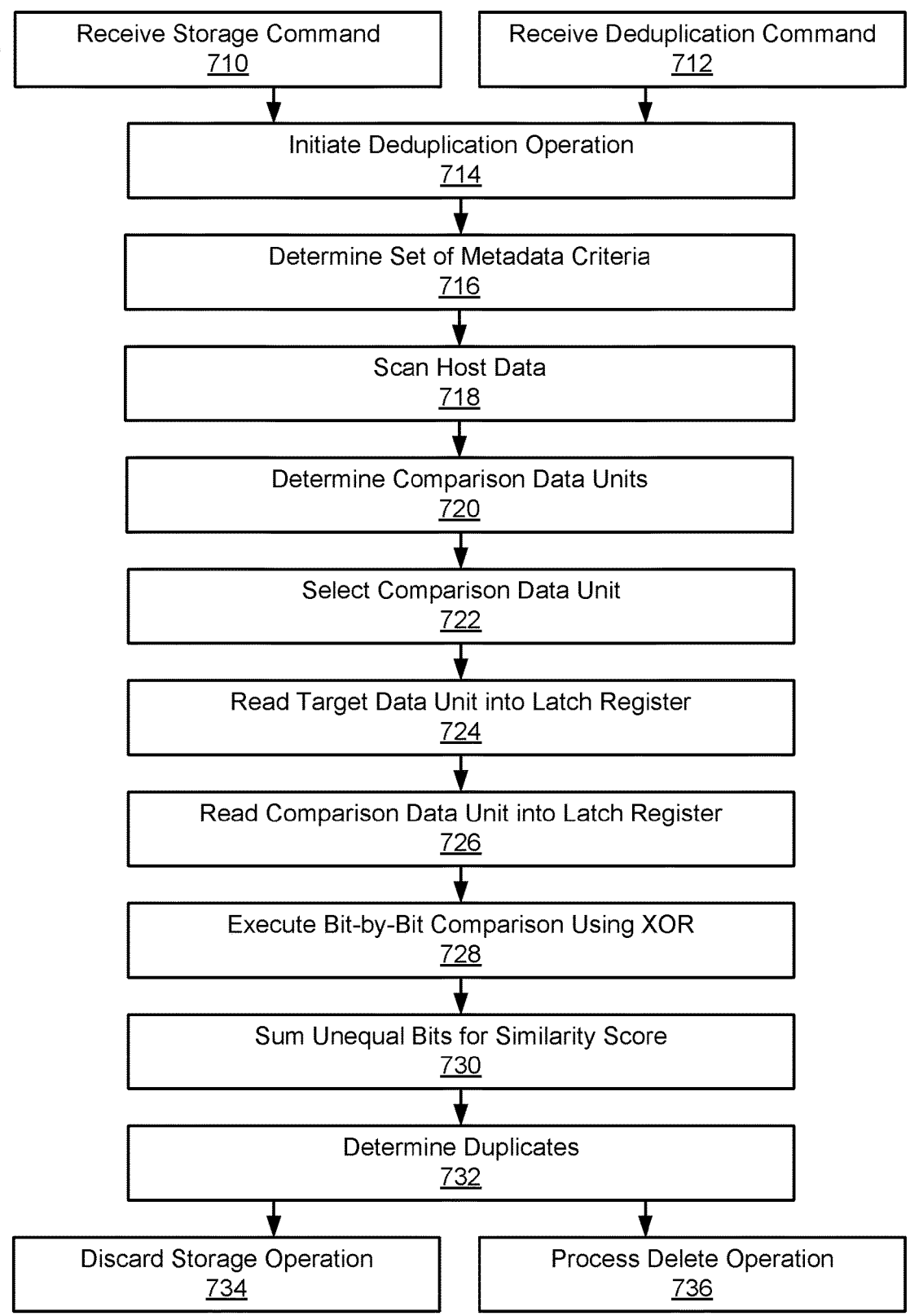
FIG. 7 is a flowchart of another example method of deduplication using in-device comparison of encoded host data.

As shown in FIG. 7, storage device 500 may be operated according to an example method for deduplication using in-device comparison of encoded host data, i.e. according to method 700 illustrated by blocks 710-736 in FIG. 7. In some embodiments, one or more blocks of method 700 may be used in conjunction with method 600 in FIG. 6.

At block 710, a storage command may be received. For example, a host interface may receive a read, write, or delete command that includes a deduplication parameter.

At block 712, a deduplication command may be received. For example, the host interface may receive a deduplication command that identifies one or more host data units to be deduplicated.

At block 714, a deduplication operation may be initiated. For example, a deduplication engine may be initiated responsive to the storage command at block 710 or the deduplication command at block 712.

At block 716, a set of metadata criteria may be determined. For example, the deduplication engine may determine a set of metadata parameters and values based on a target date unit from the command and/or parameters included with the command.

At block 718, host data may be scanned. For example, the deduplication engine may use the metadata parameter values to scan host data through a host metadata datastore or data structure.

At block 720, a set of comparison data units may be determined. For example, the deduplication engine may determine a set of host data units at block 718 to be compared to the target data unit.

At block 722, a comparison data unit may be selected from the set of comparison data units. For example, the deduplication engine may include logic for executing comparisons against each of the comparison data units in the set by randomly or sequentially selecting comparison data units from the set.

At block 724, the target data unit may be read into a latch register. For example, the deduplication engine may read the encoded target data unit from the storage medium to a latch layer 1 set of registers.

At block 726, the comparison data unit may be read into a latch register. For example, the deduplication engine may read the encoded comparison data unit from the storage medium to a latch layer 2 set of registers.

At block 728, a bit-by-bit comparison of the data units may be executed using exclusive-or logic. For example, the deduplication engine may compare the bits in latch layer 1 with their corresponding or paired bit in latch layer 2 to compare whether or not the bits are equal.

At block 730, unequal bits may be summed for a similarity score. For example, each unequal bit pair may generate a count and the deduplication engine may sum the counts for the similarity score.

At block 732, duplicates may be determined. For example, the deduplication engine may compare the similarity score against a similarity threshold and comparison data units under or meeting the similarity threshold may be included in a set of duplicate data units.

At block 734, a duplicate storage operation may be discarded. For example, a storage manager may discard a write operation for a duplicate data unit from the command processing queue rather than completing it.

At block 736, a delete operation may be processed. For example, the storage manager may generate and process delete operations to eliminate one or more duplicate data units.

Figure 8:
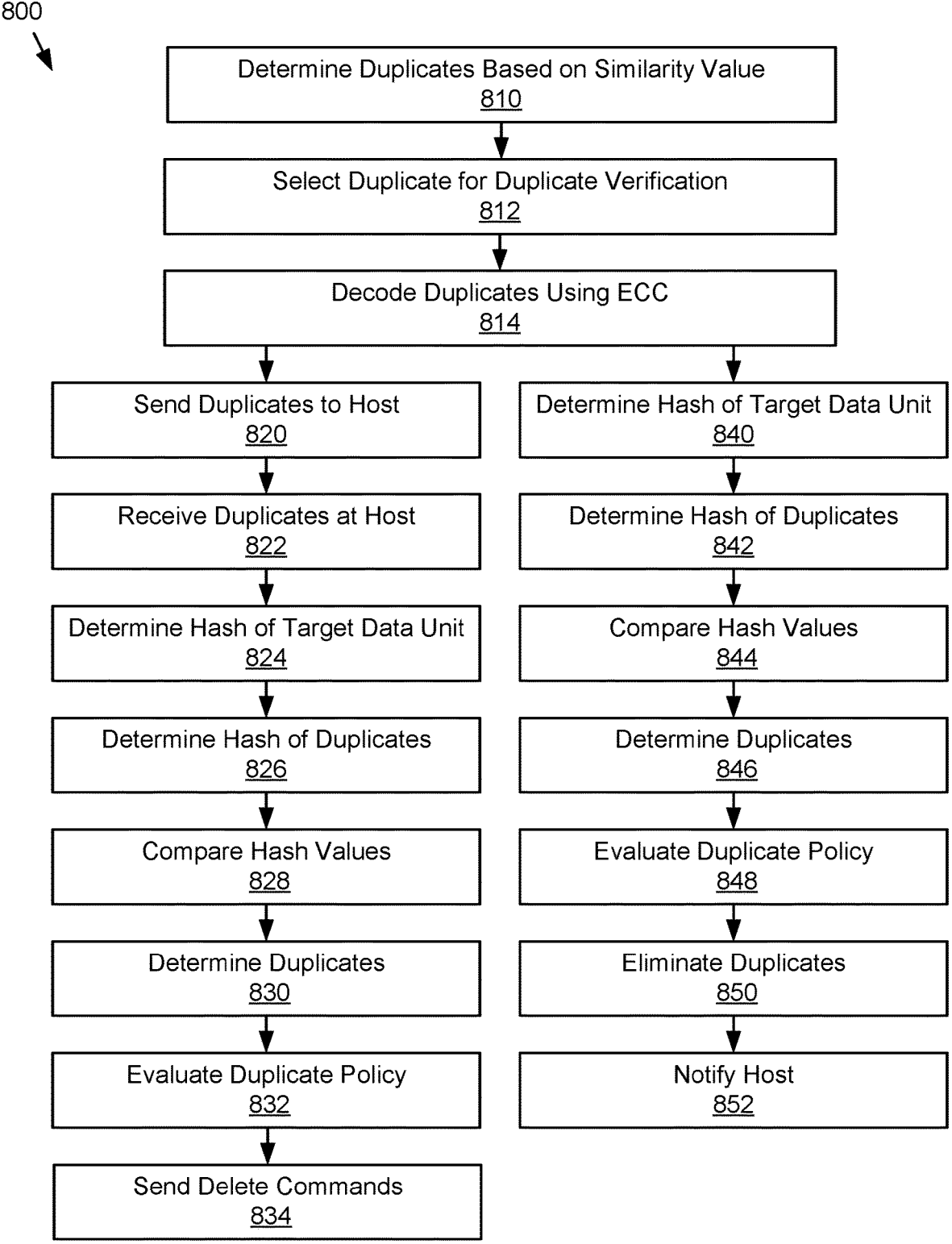
FIG. 8 is a flowchart of an example method of duplicate verification to support in-device comparison of encoded host data.

As shown in FIG. 8, storage system 300 and/or storage device 500 may be operated according to an example method for duplicate verification to support in-device comparison of encoded host data, i.e. according to method 800 illustrated by blocks 810-852 in FIG. 8. In some embodiments, one or more blocks of method 800 may be used in conjunction with method 600 in FIG. 6 and/or method 700 in FIG. 7.

At block 810, duplicates may be determined based on a similarity value. For example, a deduplication engine in a storage device may determine duplicates based on similarity values calculated from comparing encoded host data.

At block 812, at least one duplicate may be selected for duplicate verification. For example, the deduplication engine may be configured to identify duplicates for elimination and verify those duplicates prior to elimination.

At block 814, duplicate host data may be decided using ECC. For example, the storage manager may decode the selected duplicate host data using storage device ECC in a read process similar to normal read operation processing.

Blocks 820-836 may represent storage device 120 and/or 500 offloading duplicate verification to a host device 102. Blocks 840-854 may represent storage device 500 conducting duplicate verification internally.

At block 820, duplicate data units may be sent to the host. For example, the deduplication engine may initiate host interface to send the duplicate host data units to the host system for further deduplication processing.

At block 822, the host may receive the duplicate data units. For example, the host device may receive the duplicate data units in response to one or more commands that initiated the deduplication process or responsive to a background deduplication process in the storage device.

At block 824, a hash value of the target data unit may be determined. For example, the host may process the target data unit using a hashing algorithm to generate a hash value for the target data unit.

At block 826, a hash value may be determined for each duplicate data unit. For example, the host may process the duplicate data units using the same hashing algorithm to generate hash values for each duplicate data unit.

At block 828, the hash values may be compared. For example, the host may compare the target data unit hash value to the duplicate data unit hash value to determine whether or not they match.

At block 830, duplicates may be determined or verified. For example, the host may determine that only duplicate data units with matching hash values to the target data unit hash value are duplicates to be handled according to the duplicate policy of the host device.

At block 832, a duplicate policy may be evaluated. For example, the host may evaluate a duplicate policy to determine whether one or more verified duplicates exceed the number of duplicates allowed under the duplicate policy.

At block 834, delete commands may be sent. For example, the host may generate and send delete commands for any duplicate data units that should be eliminated under the duplicate policy.

At block 840, a hash value of the target data unit may be determined. For example, the deduplication engine in the storage device may process the target data unit using a hashing algorithm to generate a hash value for the target data unit.

At block 842, a hash value may be determined for each duplicate data unit. For example, the deduplication engine may process the duplicate data units using the same hashing algorithm to generate hash values for each duplicate data unit.

At block 844, the hash values may be compared. For example, the deduplication engine may compare the target data unit hash value to the duplicate data unit hash value to determine whether or not they match.

At block 846, duplicates may be determined or verified. For example, the deduplication engine may determine that only duplicate data units with matching hash values to the target data unit hash value are duplicates to be handled according to the duplicate policy of the host device and/or storage device (as defined in the deduplication configuration).

At block 848, a duplicate policy may be evaluated. For example, the deduplication engine may evaluate a duplicate policy to determine whether one or more verified duplicates exceed the number of duplicates allowed under the duplicate policy.

At block 850, one or more duplicate data units may be eliminated. For example, the deduplication engine may generate and process delete operations for any duplicate data units that should be eliminated under the duplicate policy.

At block 852, a notification may be sent to the host. For example, the storage device may generate a response message and/or notification message based on the deduplication operation and any resulting deletions.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

The invention claimed is:

1. A system comprising:
a storage device comprising:
a storage medium configured to store host data blocks; and
a storage device controller, comprising at least one processor and at least one memory, and configured to:
store, to the storage medium and through an error correction code engine in a write path of the storage device, the host data blocks, wherein the stored host data blocks comprise a first encoded comparison data unit encoded by the error correction code engine in the write path;
return, to a host system, previously-stored host data blocks responsive to decoding, through an error correction code engine in a read path of the storage device, the stored host data blocks from the storage medium;
encode, using the error correction code engine in the write path, a target data unit to generate an encoded target data unit comprised of:
an input host data block divided into a plurality of symbols; and
at least one parity symbol generated using the plurality of symbols of the input host data block and an error correction code coding algorithm for the error correction code engine in the write path;
retrieve, for a deduplication operation, the first encoded comparison data unit from the storage medium without decoding the first encoded comparison data unit using the error correction code engine in the read path of the storage device, wherein the first encoded comparison data unit comprises:
a previously-stored host data block divided into a plurality of symbols; and
at least one parity symbol generated prior to storage in the storage medium using the plurality of symbols of the previously-stored host data block and the error correction code coding algorithm for the error correction code engine in the write path;
compare, responsive to encoding the target data unit and retrieving the first encoded comparison data unit and using a bit-by-bit exclusive-or comparison, each bit of the encoded target data unit to each corresponding bit of the first encoded comparison data unit;
determine, based on a number of bits that are not equal between the encoded target data unit and the first encoded comparison data unit, a first similarity value; and
eliminate, responsive to the first similarity value, at least one duplicate data unit selected from:
the target data unit; and
the first encoded comparison data unit in the storage medium.

2. The system of claim 1, wherein the storage device controller is further configured to:
receive, from a host device, a write command indicating the target data unit for the deduplication operation;
initiate, responsive to receiving the write command, the deduplication operation;
select the first encoded comparison data unit from the storage medium; and
eliminate, responsive to the first similarity value, the target data unit by discarding the write command.

3. The system of claim 1, wherein the storage device controller is further configured to:
receive, from a host device, a deduplication command;
initiate, responsive to the deduplication command, the deduplication operation;
select the first encoded comparison data unit from the storage medium;
eliminate, responsive to the first similarity value, the first encoded comparison data unit by processing a delete operation for the comparison data unit; and
notify the host device of the delete operation.

4. The system of claim 1, wherein the storage device controller is further configured to:
initiate, responsive to deduplication trigger rules, the deduplication operation;
scan, responsive to the deduplication operation, the host data to determine the first encoded comparison data unit from a plurality of host data units stored in the storage medium;
determine, based on the scan, a plurality of encoded comparison data units including the first encoded comparison data unit;
compare the encoded target data unit to each encoded comparison data unit of the plurality of encoded comparison data units;
determine, based on each comparison of the encoded target data unit and each encoded comparison data unit, a comparison data unit similarity value;
determine, based on the comparison data unit similarity values, a plurality of duplicate data units; and
eliminate at least one duplicate data unit of the plurality of duplicate data units.

5. The system of claim 4, wherein the storage device controller is further configured to:
determine a target number of duplicate data units for the target data unit;
determine a duplicate number of the plurality of duplicate data units;
determine a difference between the target number and the duplicate number; and
eliminate, based on the difference, an elimination number of the plurality of duplicate data units from the storage medium.

6. The system of claim 1, wherein the storage device controller is further configured to:
determine a set of metadata criteria for the target data unit;
scan, responsive to the deduplication operation and using the set of metadata criteria, host metadata to determine a plurality of encoded comparison data units including the first encoded comparison data unit;
compare the encoded target data unit to each encoded comparison data unit of the plurality of encoded comparison data units;
determine, based on each comparison of the encoded target data unit and each encoded comparison data unit, a comparison data unit similarity value;

determine, based on the comparison data unit similarity values, a plurality of duplicate data units; and eliminate at least one duplicate data unit of the plurality of duplicate data units.

7. The system of claim 1, wherein comparing the encoded target data unit to the first encoded comparison data unit uses a set of hardware registers configured to:
receive the encoded target data unit;
receive the first encoded comparison data unit; and
execute the bit-by-bit exclusive-or comparison.

8. The system of claim 7, wherein:
the storage device further comprises:
a first set of latch registers; and
a second set of latch registers; and
the storage device controller is further configured to:
read the encoded target data unit into the first set of latch registers;
read the first encoded comparison data unit into the second set of latch registers;
execute a bit-by-bit exclusive-or comparison of aligned latch registers between the first set of latch registers and the second set of latch registers; and
sum the number of bits that are not equal to determine the first similarity value.

9. The system of claim 7, wherein the storage device controller is further configured to:
determine a similarity threshold corresponding to a number of acceptable bit errors;
compare the first similarity value to the similarity threshold; and
eliminate, responsive to the first similarity value being less than the similarity threshold, at least one duplicate data unit selected from:
the target data unit; and
the first encoded comparison data unit in the storage medium.

10. The system of claim 1, wherein the storage device controller is further configured to:
select, based on the first similarity value, the first encoded comparison data unit for duplicate verification;
determine, based on a decoded first comparison data unit, a first hash value of the decoded first comparison data unit;
determine, based on a decoded target data unit, a target hash value of the decoded target data unit; and
determine, based on comparing the first hash value and the target hash value, the at least one duplicate data unit.

11. The system of claim 1, further comprising:
a host device comprising:
a host processor;
a host memory; and
a deduplication manager configured to:
determine a decoded target data unit;
receive, from the storage device and responsive to the first similarity value, a decoded first comparison data unit;
determine, based on the decoded first comparison data unit, a first hash value of the decoded first comparison data unit;
determine, based on the decoded target data unit, a target hash value of the decoded target data unit;
determine, based on comparing the first hash value and the target hash value, the at least one duplicate data unit; and
send, to the storage device, a delete command for the at least one duplicate data unit.

12. A computer-implemented method, comprising:
storing, by a storage device and through an error correction code engine in a write path of the storage device, host data blocks to a storage medium of the storage device, wherein the stored host data blocks comprise a first encoded comparison data unit encoded by the error correction code engine in the write path;
returning, by the storage device and to a host system, previously-stored host data blocks responsive to decoding, through an error correction code engine in a read path of the storage device, the stored host data blocks from the storage medium;
encoding, by the storage device and using the error correction code engine in the write path, a target data unit to generate an encoded target data unit comprised of:
an input host data block divided into a plurality of symbols; and
at least one parity symbol generated using the plurality of symbols of the input host data block and an error correction code coding algorithm for the error correction code engine in the write path;
retrieving, by the storage device and for a deduplication operation, a first encoded comparison data unit from the storage medium of the storage device without decoding the first encoded comparison data unit using the error correction code engine in the read path of the storage device, wherein the first encoded comparison data unit comprises:
a previously-stored host data block divided into a plurality of symbols; and
at least one parity symbol generated prior to storage in the storage medium using the plurality of symbols of the previously-stored host data block and the error correction code coding algorithm for the error correction code;
comparing, responsive to encoding the target data unit and retrieving the first encoded comparison data unit and using a bit-by-bit exclusive-or comparison, each bit of the encoded target data unit to each corresponding bit of the first encoded comparison data unit;
determining, based on a number of bits that are not equal between the encoded target data unit and the first encoded comparison data unit, a first similarity value; and
eliminating, responsive to the first similarity value, at least one duplicate data unit selected from:
the target data unit; and
the first encoded comparison data unit in the storage medium.

13. The computer-implemented method of claim 12, further comprising:
scanning, responsive to the deduplication operation, host data to determine the first encoded comparison data unit from a plurality of host data units stored in the storage medium;
determining, based on the scanning, a plurality of encoded comparison data units including the first encoded comparison data unit;
comparing the encoded target data unit to each encoded comparison data unit of the plurality of encoded comparison data units;
determining, based on each comparison of the encoded target data unit and each encoded comparison data unit, a comparison data unit similarity value;
determining, based on the comparison data unit similarity values, a plurality of duplicate data units; and eliminating at least one duplicate data unit of the plurality of duplicate data units.

14. The computer-implemented method of claim 13, further comprising:
  determining a target number of duplicate data units for the target data unit;
  determining a duplicate number of the plurality of duplicate data units;
  determining a difference between the target number and the duplicate number; and
  eliminating, based on the difference, an elimination number of the plurality of duplicate data units from the storage medium.

15. The computer-implemented method of claim 12, further comprising:
  determining a set of metadata criteria for the target data unit;
  scanning, responsive to the deduplication operation and using the set of metadata criteria, host metadata to determine a plurality of encoded comparison data units including the first encoded comparison data unit;
  comparing the encoded target data unit to each encoded comparison data unit of the plurality of encoded comparison data units;
  determining, based on each comparison of the encoded target data unit and each encoded comparison data unit, a comparison data unit similarity value;
  determining, based on the comparison data unit similarity values, a plurality of duplicate data units; and
  eliminating at least one duplicate data unit of the plurality of duplicate data units.

16. The computer-implemented method of claim 12, wherein comparing the encoded target data unit to the first encoded comparison data unit uses a set of hardware registers configured to:
  receive the encoded target data unit;
  receive the first encoded comparison data unit; and
  execute the bit-by-bit exclusive-or comparison.

17. The computer-implemented method of claim 16, further comprising:
  reading the encoded target data unit into a first set of latch registers in the storage device;
  reading the first encoded comparison data unit into a second set of latch registers in the storage device;
  executing a bit-by-bit exclusive-or comparison of aligned latch registers between the first set of latch registers and the second set of latch registers; and
  summing the number of bits that are not equal to determine the first similarity value.

18. The computer-implemented method of claim 16, further comprising:
  determining a similarity threshold corresponding to a number of acceptable bit errors;
  comparing the first similarity value to the similarity threshold; and
  eliminating, responsive to the first similarity value being less than the similarity threshold, at least one duplicate data unit selected from:
    the target data unit; and
    the first encoded comparison data unit in the storage medium.

19. The computer-implemented method of claim 12, further comprising:
  selecting, based on the first similarity value, the first encoded comparison data unit for duplicate verification;
  determining, based on a decoded first comparison data unit, a first hash value of the decoded first comparison data unit;
  determining, based on a decoded target data unit, a target hash value of the decoded target data unit; and
  determining, based on comparing the first hash value and the target hash value, the at least one duplicate data unit.

20. A storage device, comprising:
  a storage medium configured to store host data blocks;
  a storage device controller comprising:
    at least one processor; and
    at least one operating memory;
  means for storing, through an error correction code engine in a write path of the storage device, the host data blocks to the storage medium, wherein the stored host data blocks comprise a first encoded comparison data unit encoded by the error correction code engine in the write path;
  means for returning, to a host system, previously-stored host data blocks responsive to decoding, through an error correction code engine in a read path of the storage device, the stored host data blocks from the storage medium;
  means for encoding, using the error correction code engine in the write path, a target data unit to generate an encoded target data unit comprised of:
    an input host data block divided into a plurality of symbols; and
    at least one parity symbol generated using the plurality of symbols of the input host data block and an error correction code coding algorithm for the error correction code engine in the write path;
  means for retrieving, for a deduplication operation, a first encoded comparison data unit from the storage medium without decoding the first encoded comparison data unit using the error correction code engine in the read path of the storage device, wherein the first encoded comparison data unit comprises:
    a previously-stored host data block divided into a plurality of symbols; and
    at least one parity symbol generated prior to storage in the storage medium using the plurality of symbols of the previously-stored host data block and the error correction code coding algorithm for the error correction code engine in the write path;
  means for comparing, responsive to encoding the target data unit and retrieving the first encoded comparison data unit and using a bit-by-bit exclusive-or comparison, each bit of the encoded target data unit to each corresponding bit of the first encoded comparison data unit;
  means for determining, based on a number of bits that are not equal between the encoded target data unit and the first encoded comparison data unit, a first similarity value; and means for eliminating, responsive to the first similarity value, at least one duplicate data unit selected from:
the target data unit; and
the first encoded comparison data unit in the storage medium.

\* \* \* \* \*